United States Patent
Kim

(10) Patent No.: US 9,501,723 B2
(45) Date of Patent: Nov. 22, 2016

(54) METHOD OF CLASSIFYING OBJECTS IN SCENES

(71) Applicant: CANON KABUSHIKI KAISHA, Tokyo (JP)

(72) Inventor: Min Sub Kim, Epping (AU)

(73) Assignee: Canon Kabushiki Kaisha, Tokyo (JP)

( * ) Notice: Subject to any disclaimer, the term of this patent is extended or adjusted under 35 U.S.C. 154(b) by 150 days.

(21) Appl. No.: 14/579,950

(22) Filed: Dec. 22, 2014

(65) Prior Publication Data

US 2015/0178597 A1   Jun. 25, 2015

(30) Foreign Application Priority Data

Dec. 24, 2013 (AU) .................. 2013280203

(51) Int. Cl.
G06K 9/62 (2006.01)
G06K 9/00 (2006.01)

(52) U.S. Cl.
CPC ......... *G06K 9/6296* (2013.01); *G06K 9/00624* (2013.01)

(58) Field of Classification Search
CPC .............. G06K 9/00624; G06K 9/00718; G06K 9/00771; G06K 9/6224; G06K 9/6261; G06K 9/6267; G06K 9/6285; G06K 9/6296; G06K 9/6297
See application file for complete search history.

(56) References Cited

U.S. PATENT DOCUMENTS

| | | | |
|---|---|---|---|
| 2006/0291721 A1 | 12/2006 | Torr et al. | 382/73 |
| 2013/0132311 A1* | 5/2013 | Liu et al. | 706/12 |
| 2014/0355879 A1* | 12/2014 | Agosta et al. | G06K 9/4604 382/170 |

OTHER PUBLICATIONS

Felzenszwalb et al., "Efficient Belief Propagation for Early Vision", CVPR 2004, Proceedings from IEEE Conference on Computer Vision and Pattern Recognition, Washington, DC, USA, Jun. 2004; IEEE: 2004; p. 261-268.

Kohli et al., "Efficiently Solving Dynamic Markov Random Fields using Graph Cuts", Proceedings from International Conference on Computer Vision, Beijing, China, Oct. 2005; IEEE: 2005; p. 922-929.

* cited by examiner

*Primary Examiner* — Andrew W Johns
(74) *Attorney, Agent, or Firm* — Canon USA, Inc. IP Division

(57) ABSTRACT

A method for classifying objects in a scene captured by a camera determines a likelihood of first set of states for the objects. Each first set is a classification of one of the objects, and partitions a solution space based on the determined likelihood of the first set of states, each partition representing combinations of the classifications of the objects. The partitioning is applied to a solution space of a second set of states, each partition representing combinations of the classifications of a subset of the objects. The method determines a likelihood of the second set of states for the subset of the objects, each state of the second set of states being a classification of one of the subset of objects, and classifies a subset of objects according to the determined likelihood of the second set of states and the partitioning of the second set of states.

19 Claims, 13 Drawing Sheets

METHOD OF CLASSIFYING OBJECTS IN SCENES

REFERENCE TO RELATED PATENT APPLICATION(S)

This application claims the benefit under 35 U.S.C. §119 of the filing date of Australian Patent Application No. 2013280203, filed Dec. 24, 2013, hereby incorporated by reference in its entirety as if fully set forth herein.

TECHNICAL FIELD

The present invention relates to image classification and, in particular, to a method, apparatus and system for classifying objects in a scene captured by a camera. The present disclosure also relates to a computer program product including a computer readable medium having recorded thereon a computer program for classifying objects in a scene captured by a camera.

BACKGROUND

Analysis of a scene captured by a camera often involves classifying the objects that appear in the scene.

A classification of an object appearing in a scene is often related to classifications of other objects appearing in the scene. For example, an indoors office scene usually contains objects that would be classified differently to objects found in an outdoors forest scene. Therefore, it is desirable to exploit the correlation between classifications of objects appearing within a scene.

One type of approach to exploiting such correlations is to use a probabilistic model of a scene, where some discrete random variables in the probabilistic model each represent a classification of an object in a scene. Each variable has a set of possible states, where each state corresponds to a possible classification of the object in the scene corresponding to the variable. A probabilistic model specifies a joint probability distribution over possible combinations of classifications of the objects in the scene, thus modelling the correlation between classifications of the objects. The objects may be classified using a probabilistic model by finding the most probable classifications of the objects according to the joint probability distribution of the probabilistic model. Equivalently, the correlations between classifications of objects appearing in the scene may be expressed as a combinatorial optimization problem such as energy minimization, and the objects classified by finding an optima of the combinatorial optimization problem. In the following text, the term probabilistic models should be considered to include equivalent combinatorial optimization formulations.

When multiple similar scenes are captured by a camera, a probabilistic model may be applied to each scene individually. In this case, as the scenes are similar they may yield similar probabilistic models. Finding the most probable classifications of objects according to a probabilistic model is often computationally expensive. It is therefore desirable to exploit the similarity between the probabilistic models in order to reduce the computation time.

One approach to exploit the similarity between two probabilistic models is to associate each variable in a first probabilistic model with one or more variables in a second probabilistic model. A message-passing algorithm, called belief propagation, can be used to solve the first probabilistic model. An intermediate result of the message-passing algorithm can be transferred from the first probabilistic model to a message-passing algorithm used to solve the second probabilistic model. However, this approach requires that the variables of the second probabilistic model have the same set of possible states as each associated variable of the first probabilistic model. Also, the message-passing algorithm may find only approximate optima for a probabilistic model, which is sub-optimal. Many object classification tasks do not achieve a desired level of accuracy when sub-optimal solutions are provided for a probabilistic model.

A second approach to exploit the similarity between two probabilistic models is to transform each probabilistic model into an equivalent flow network, such that finding the maximum flow solution to the flow network is equivalent to finding the most probable state in the probabilistic model. A first maximum flow solution to a first flow network for the first probabilistic model can then be used to initialize a second flow network solution for a second flow network for the second probabilistic model. However, this approach requires a one-to-one mapping from variables and states of the first probabilistic model to variables and states of the second probabilistic model, and further requires constructing a pair of equivalent flow networks for each of the probabilistic models. This is possible for only a restricted class of probabilistic models that have sub-modular potential functions. Many object classification tasks cannot use sub-modular potential functions.

Thus, there exists a need for an improved method for exploiting the similarity between probabilistic models to reduce the computational cost of solving multiple similar probabilistic models. Also, any solution should desirably operate with probabilistic models that do not have sub-modular potential functions, and where sub-optimal solutions are insufficient.

SUMMARY

According to one aspect of the present disclosure there is provided a method of classifying objects in a scene, captured by a camera, the method comprising:

determining a likelihood of first set of states for the objects in the scene, each of the first set of states being a classification of one of the objects in the scene;

partitioning a solution space based on the determined likelihood of the first set of states, each partition of the solution space representing combinations of the classifications of the objects in the scene;

applying the partitioning of the solution space to a solution space of a second set of states, each partition of the solution space of the second set of states representing combinations of the classifications of a subset of objects in the scene;

determining a likelihood of the second set of states for the subset of the objects in the scene, each state of the second set of states being a classification of one of the subset of objects in the scene; and classifying at least one of the subset of objects in the scene according to the determined likelihood of the second set of states and the partitioning of the solution space of the second set of states.

According to another aspect there is provided a method of classifying objects in a scene, the method comprising:

determining a likelihood of first set of states for the objects in a first scene representation, each of the first set of states being a classification of one of the objects in the first scene representation;

partitioning a solution space based on the determined likelihood of the first set of states, each partition of the solution space representing combinations of the classifications of the objects in the first scene representation;

applying the partitioning of the solution space to a solution space of a second set of states, each partition of the solution space of the second set of states representing combinations of the classifications of a subset of objects in a second scene representation associated with the scene;

determining a likelihood of the second set of states for the subset of the objects in the scene, each state of the second set of states being a classification of one of the subset of objects in the second scene representation; and classifying at least one of the subset of objects in the second scene representation according to the determined likelihood of the second set of states and the partitioning of the solution space of the second set of states.

Typically the first scene representation is formed from a first image of a first scene, and the second scene representation is formed from a second image of a second scene. Preferably the first and second scenes at least partly overlap.

Most desirably the partitions are formed as lists of states, where each list of states is associated with a discrete random variable of the first or second scene representation.

In a specific implementation the first and second scene representations comprise discrete Markov random field (MRF) representations, and for a first kind of difference between the scene representations, the partitioning makes no changes to the partitions, and the lists of states stored by the partitions are associated with discrete random variables and states of the second scene representation. Advantageously the first kind of difference comprises difference in values of potential functions of the scene representations.

In another specific implementation the first and second scene representations comprise discrete Markov random field (MRF) representations, and for a second kind of difference, a partition is transformed, for each variable for which new states have been added, by adding the new states to the list of states for that variable in the partition. Desirably the new states are added in replacement of an existing state and the list of states includes the state to be replaced, then the state to be replaced is removed from the list of states. Preferably the second kind of difference between the scene representations is where the second scene representation comprises new states for variables, the new states being in addition to existing states of those variables or in replacement of existing states of those variables.

In a further specific implementation the first and second scene representations comprise discrete Markov random field (MRF) representations, and for a third kind of difference, a partition is transformed, for each new variable, by adding all of the possible states of the new variable to the partition, wherein the lists of states for other variables in the partition are unchanged. Desirably the third kind of difference comprises the second scene representation containing new variables in addition to the variables of the first scene representation.

In a most specific implementation the first and second scene representations comprise discrete Markov random field (MRF) representations, and the partitioning is responsive to three kinds of differences between the scene representations, being:

(i) a first kind of difference between the scene representations, the partitioning makes no changes to the partitions, and the lists of states stored by the partitions are associated with discrete random variables and states of the second scene representation, the first kind of difference comprising differences in values of potential functions of the scene representations;

(ii) a second kind of difference, where a partition is transformed, for each variable for which new states have been added, by adding the new states to the list of states for that variable in the partition, wherein the new states are added in replacement of an existing state and the list of states includes the state to be replaced, then the state to be replaced is removed from the list of states, wherein the second kind of difference between the scene representations is where the second scene representation comprises new states for variables, the new states being in addition to existing states of those variables or in replacement of existing states of those variables; and (iii) a third kind of difference, where a partition is transformed, for each new variable, by adding all of the possible states of the new variable to the partition, wherein the lists of states for other variables in the partition are unchanged, wherein the third kind of difference comprises the second scene representation containing new variables in addition to the variables of the first scene representation.

Preferably the first and second scene representations comprise discrete Markov random field (MRF) representations, and the step of applying the partitioning comprises applying the partitioning of a first model derived from the first scene representation to a second model associated with the second scene representation.

Advantageously the partitioning may further comprises storing the partitions in a priority queue ordered according to the first scene representation and the applying comprises transforming the stored partitions into partitions of the second scene representation. Here the method may further comprise adding a new variable to each partition in the priority queue such that partitions of the second scene representation derived from the first scene representation are identifiable therefrom.

Other aspects are also disclosed.

BRIEF DESCRIPTION OF THE DRAWINGS

At least one embodiment of the invention will now be described with reference to the following drawings, in which.

DETAILED DESCRIPTION INCLUDING BEST MODE

Context

Figure 1:
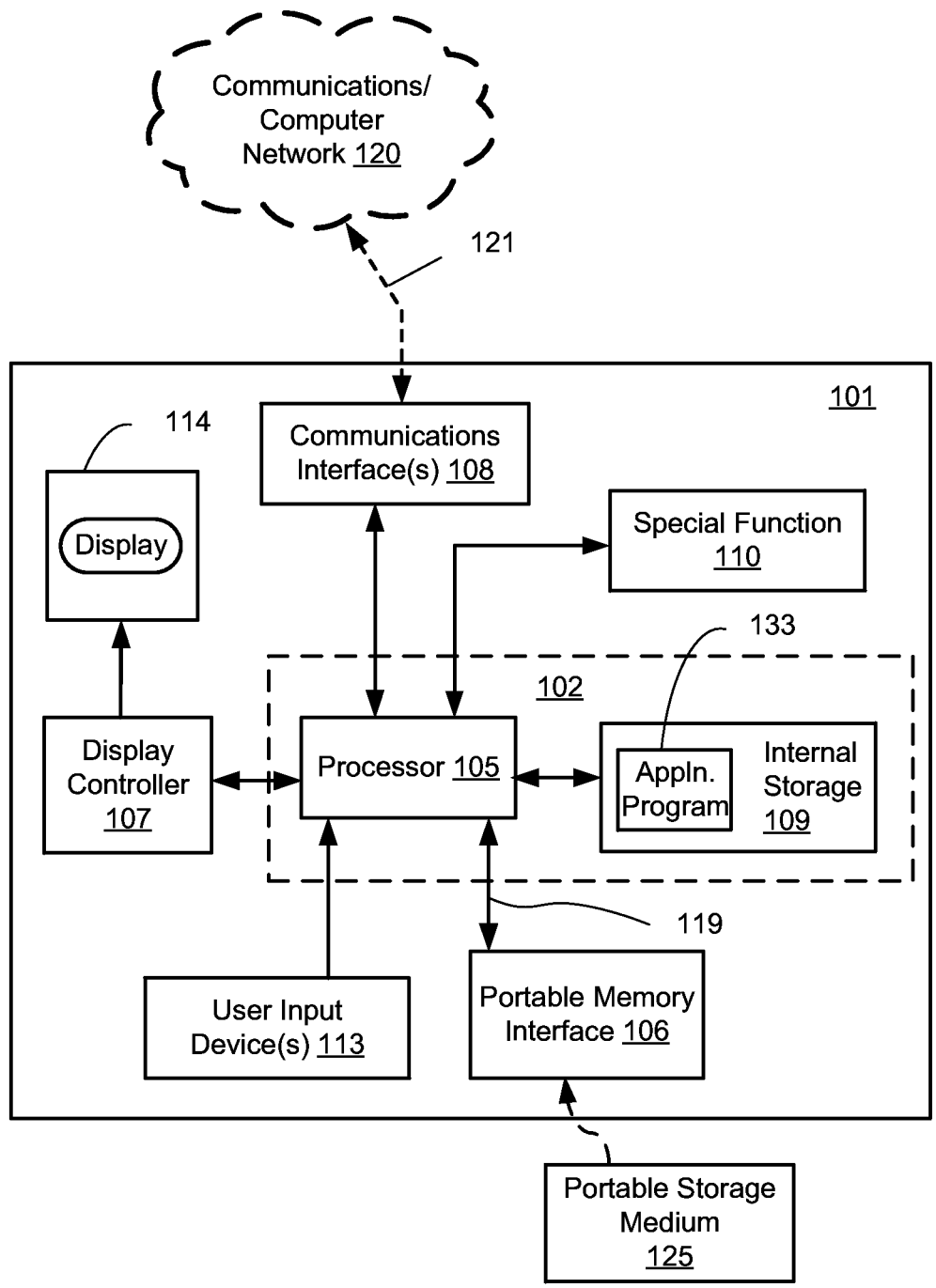
FIG. 1 and FIG. 2 collectively form a schematic block diagram representation of a camera system upon which described arrangements can preferably be practiced.

Where reference is made in any one or more of the accompanying drawings to steps and/or features that have the same reference numerals, those steps and/or features have for the purposes of this description the same function (s) or operation(s), unless the contrary intention appears.

A computer-implemented method, system, and computer program product for classifying objects in a scene is described below.

Figure 2:
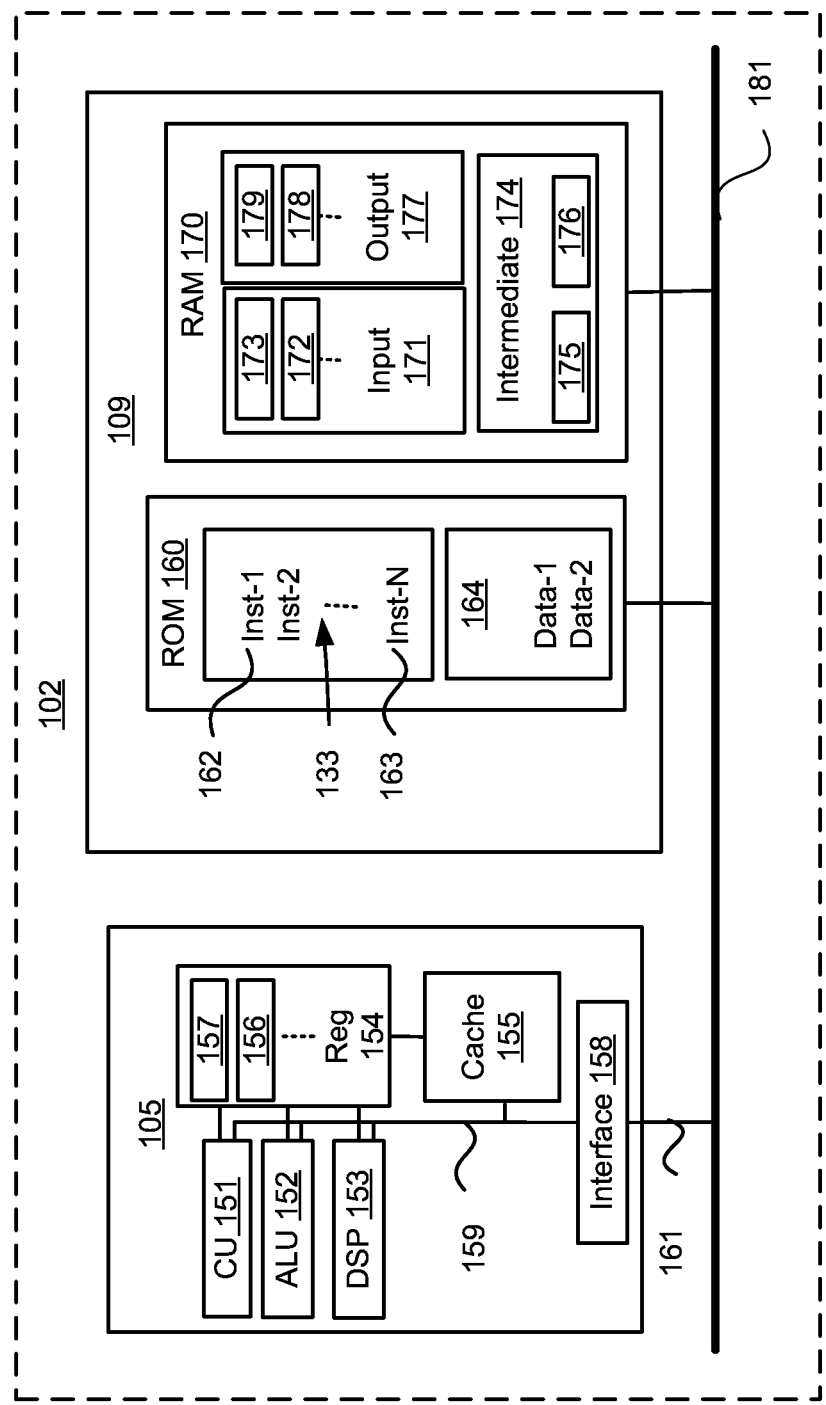

FIGS. 1 and 2 collectively form a schematic block diagram of a camera system 101 including embedded components, upon which classification methods to be described are desirably practiced. The camera system 101 may be, for example, formed as part of a digital camera or a mobile phone, in which processing resources are relatively limited. Nevertheless, the methods to be described may also be performed on higher-level devices such as desktop computers, server computers, and other such devices with significantly larger processing resources.

The camera system 101 is used to capture input images representing visual content of a scene appearing in the field of view (FOV) of the camera system 101. The input images give representations of at least one scene and typically may be captured at different times of the same (identical) field of view, and thus the input images are directly representative of changes in scene content between the different times. An example of this may be fixed surveillance camera imaging a hallway through which people walk at different times. Alternatively, the input images may be captured simultaneously or at different times, but of somewhat different fields of view. An example of this may be pan-tilt-zoom (PTZ) surveillance camera tracking over a predefined path over a predefined period, and capturing image frames at a video rate during that period. Here the fields of view for some individual frames may be almost identical, and many may at least partly overlap. Some frames however may not overlap. The input images may further be captured by different cameras, typically having overlapping but non-identical fields of view.

As seen in FIG. 1, the camera system 101 comprises an embedded controller 102. In the present example, the controller 102 has a processing unit (or processor) 105 which is bi-directionally coupled to an internal storage module 109. The storage module 109 may be formed from non-volatile semiconductor read only memory (ROM) 160 and semiconductor random access memory (RAM) 170, as seen in FIG. 2. The RAM 170 may be volatile, non-volatile or a combination of volatile and non-volatile memory.

The camera system 101 includes a display controller 107, which is connected to a display 114, such as a liquid crystal display (LCD) panel or the like. The display controller 107 is configured for displaying graphical images on the display 114 in accordance with instructions received from the controller 102, to which the display controller 107 is connected.

The camera system 101 also includes user input devices 113 which are typically formed by a keypad or like controls. In some implementations, the user input devices 113 may include a touch sensitive panel physically associated with the display 114 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 1, the camera system 101 also comprises a portable memory interface 106, which is coupled to the processor 105 via a connection 119. The portable memory interface 106 allows a complementary portable memory device 125 to be coupled to the camera system 101 to act as a source or destination of data or to supplement the internal storage module 109. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The camera system 101 also has a communications interface 108 to permit coupling of the camera system 101 to a computer or communications network 120 via a connection 121. The connection 121 may be wired or wireless. For example, the connection 121 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

Typically, the controller 102, in conjunction with further special function components 110, is provided to perform the functions of the camera system 101. The components 110 may represent an optical system including a lens, focus control and image sensor. In one arrangement, the sensor is a photo-sensitive sensor array. As another example, the camera system 101 may be part of a mobile telephone handset. In this instance, the components 110 may also represent those components required for communications in a cellular telephone environment. The special function components 110 may also represent a number of encoders and decoders of a type including Joint Photographic Experts Group (JPEG), (Moving Picture Experts Group) MPEG, MPEG-1 Audio Layer 3 (MP3), and the like.

The methods described below may be implemented using the embedded controller 102, where the processes of FIGS. 3 to 13 may be implemented as one or more software application programs 133 executable within the embedded controller 102. The camera system 101 of FIG. 1 implements the described methods. In particular, with reference to FIG. 2, the steps of the described methods are effected by instructions in the software 133 that are performed within the controller 102. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 133 of the embedded controller 102 is typically stored in the non-volatile ROM 160 of the internal storage module 109. The software 133 stored in the ROM 160 can be updated when required from a computer readable medium. The software 133 can be loaded into and executed by the processor 105. In some instances, the processor 105 may execute software instructions that are located in RAM 170. Software instructions may be loaded into the RAM 170 by the processor 105 initiating a copy of one or more code modules from ROM 160 into RAM 170. Alternatively, the software instructions of one or more code modules may be pre-installed in a non-volatile region of RAM 170 by a manufacturer. After one or more code modules have been located in RAM 170, the processor 105 may execute software instructions of the one or more code modules.

The application program 133 is typically pre-installed and stored in the ROM 160 by a manufacturer, prior to distribution of the camera system 101. However, in some instances, the application programs 133 may be supplied to the user encoded on one or more CD-ROM (not shown) and read via the portable memory interface 106 of FIG. 1 prior to storage in the internal storage module 109 or in the portable memory 125. In another alternative, the software application program 133 may be read by the processor 105 from the network 120, or loaded into the controller 102 or the portable storage medium 125 from other computer readable media. Computer readable storage media refers to any non-transitory tangible storage medium that participates in providing instructions and/or data to the controller 102 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the camera system 101. Examples of transitory or non-tangible computer readable transmission media that may also participate in the provision of software, application programs, instructions and/or data to the camera system 101 include radio or infra-red transmission channels as well as a network connection to another computer or networked device, and the Internet or Intranets including e-mail transmissions and information recorded on Websites and the like. A computer readable storage medium having such software or computer program recorded on it is a computer program product.

The second part of the application programs 133 and the corresponding code modules mentioned above may be executed to implement one or more graphical user interfaces (GUIs) to be rendered or otherwise represented upon the display 114 of FIG. 1. Through manipulation of the user input device 113 (e.g., the keypad), a user of the camera system 101 and the application programs 133 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 2 illustrates in detail the embedded controller 102 having the processor 105 for executing the application programs 133 and the internal storage 109. The internal storage 109 comprises read only memory (ROM) 160 and random access memory (RAM) 170. The processor 105 is able to execute the application programs 133 stored in one or both of the connected memories 160 and 170. When the camera system 101 is initially powered up, a system program resident in the ROM 160 is executed. The application program 133 permanently stored in the ROM 160 is sometimes referred to as "firmware". Execution of the firmware by the processor 105 may fulfil various functions, including processor management, memory management, device management, storage management and user interface.

The processor 105 typically includes a number of functional modules including a control unit (CU) 151, an arithmetic logic unit (ALU) 152 and a local or internal memory comprising a set of registers 154 which typically contain atomic data elements 156, 157, along with internal buffer or cache memory 155. One or more internal buses 159 interconnect these functional modules. The processor 105 typically also has one or more interfaces 158 for communicating with external devices via system bus 181, using a connection 161.

The application program 133 includes a sequence of instructions 162 through 163 that may include conditional branch and loop instructions. The program 133 may also include data, which is used in execution of the program 133. This data may be stored as part of the instruction or in a separate location 164 within the ROM 160 or RAM 170.

In general, the processor 105 is given a set of instructions, which are executed therein. This set of instructions may be organized into blocks, which perform specific tasks or handle specific events that occur in the camera system 101. Typically, the application program 133 waits for events and subsequently executes the block of code associated with that event. Events may be triggered in response to input from a user, via the user input devices 113 of FIG. 1, as detected by the processor 105. Events may also be triggered in response to other sensors and interfaces in the electronic device 101.

The execution of a set of the instructions may require numeric variables to be read and modified. Such numeric variables are stored in the RAM 170. The disclosed method uses input variables 171 that are stored in known locations 172, 173 in the memory 170. The input variables 171 are processed to produce output variables 177 that are stored in known locations 178, 179 in the memory 170. Intermediate variables 174 may be stored in additional memory locations in locations 175, 176 of the memory 170. Alternatively, some intermediate variables may only exist in the registers 154 of the processor 105.

The execution of a sequence of instructions is achieved in the processor 105 by repeated application of a fetch-execute cycle. The control unit 151 of the processor 105 maintains a register called the program counter, which contains the address in ROM 160 or RAM 170 of the next instruction to be executed. At the start of the fetch-execute cycle, the contents of the memory address indexed by the program counter is loaded into the control unit 151. The instruction thus loaded controls the subsequent operation of the processor 105, causing for example, data to be loaded from ROM memory 160 into processor registers 154, the contents of a register to be arithmetically combined with the contents of another register, the contents of a register to be written to the location stored in another register and so on. At the end of the fetch-execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 133, and is performed by repeated execution of a fetch-execute cycle in the processor 105 or similar programmatic operation of other independent processor blocks in the camera system 101.

Overview

Objects in an image of a scene, for example captured by the camera system 101 and stored to the memory 109 or 125, can be classified by constructing a probabilistic model for the scene, and then determining a most likely state of the probabilistic model. A state of the probabilistic model corresponds to a combination of classifications, one classification for each object in the scene. To determine the most likely state of the probabilistic model, the present arrangements presently disclosed use a partitioning method. The partitioning method partitions the solution space of the probabilistic model, where the solution space includes all possible states of the probabilistic model, each state being a combination of possible classifications for the objects in the scene.

When classifying objects using probabilistic models and partitioning as described above, the presently disclosed arrangements use the analysis of a first scene to reduce the computation time required to classify the objects in a second scene. Computation time is reduced by using the results from the first analysed scene, which is similar to the second scene. This is achieved by using initializing the partitioning method for the second scene with the partitioning used in determining classifications for the first scene. The partitioning from the first scene is used to initialize the partitioning for the solution space of the second scene. If the probabilistic model for the second scene is similar to the probabilistic model for the first scene, then initializing the partitioning in the manner described provides a good initialization for the partitioning method for the probabilistic model for the second scene. From the initialization, the partitioning method is then able to quickly find the most likely state of the probabilistic model for the new scene, which can then be used to determine classifications of the objects in the second scene.

First Implementation

Figure 3:
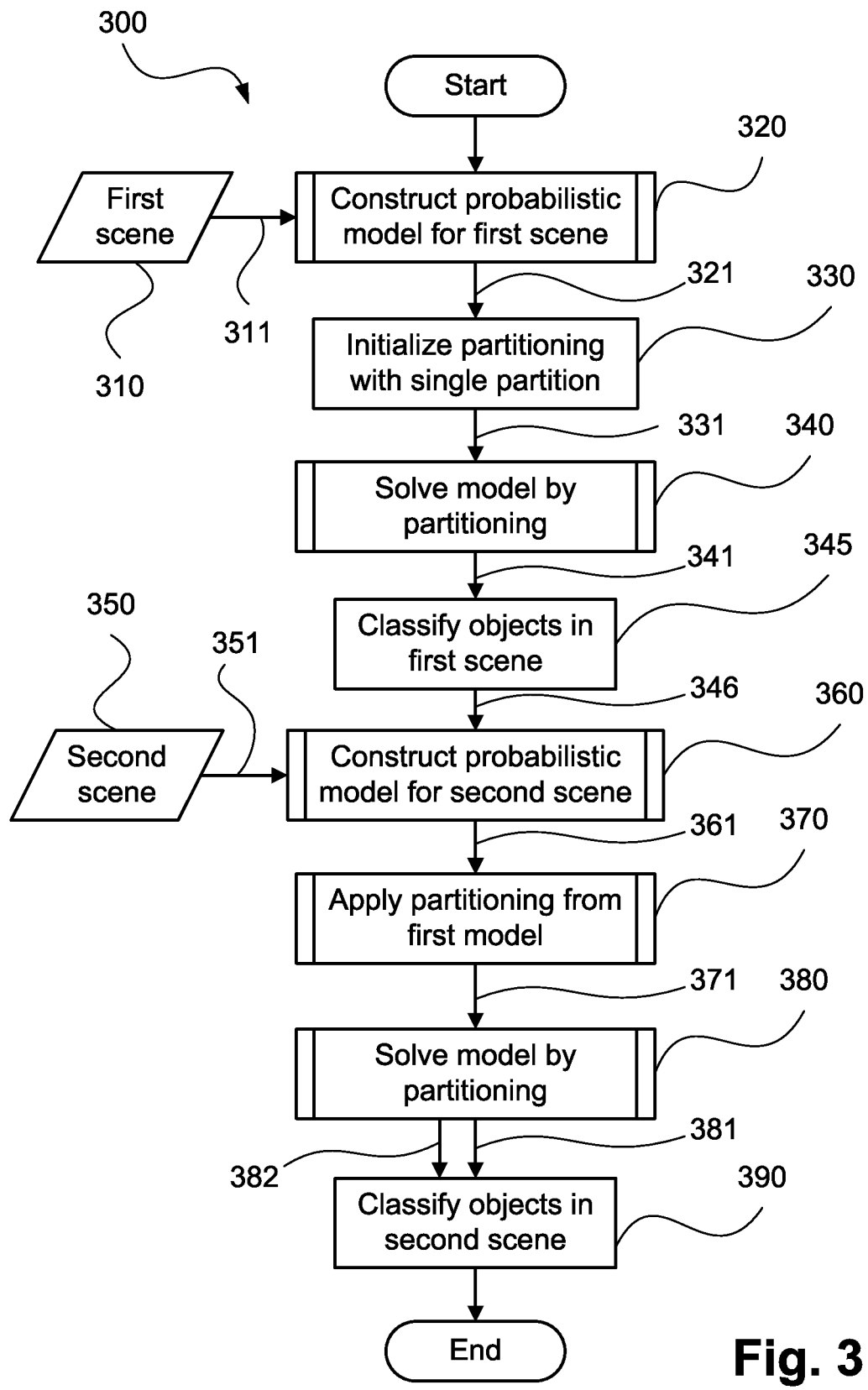
FIG. 3 is a schematic flow diagram, showing a method of classifying objects in a scene.

With reference to FIGS. 3 to 9B, a method 300 for classifying objects in a scene 350 by using results from analysis of a first scene 310 will now be described. FIG. 3 shows the top-level flow diagram. Input to the method is formed by scene representation images 311 and 351 of the first scene 310 and of a second scene 350 respectively. The images 311 and 351 may be captured using any of the approaches discussed above. Regardless of the mode of capture, the quality of any classification result arising from the method 300 will typically depend upon the content identicality between the input images 311 and 351, and more specifically on content uniformity in backgrounds to each of the captured scenes, that typically at least partly overlap. The output is a classification for each object in both the first scene 310 and the second scene 350. The flow diagram in FIG. 3 can be divided into two logical parts in which a first part analyses the first scene 310, and a second part analyses the second scene 350 based on the analysis of the first scene 310. The method 300 is preferably implemented using software, for example stored in the memory 109 of the camera and executable by the processor 105 and operating upon images captured by the camera 101 via imaging devices associated with the special function 110.

In this implementation, object classifications are based on solving probabilistic models, that may be considered as scene representations. The probabilistic model is preferably scene representation formed by a discrete Markov random field (MRF). A discrete MRF specifies a probability distribution over a set of N discrete random variables $X_1, X_2, \ldots, X_N$. Each discrete random variable $X_i$ is associated with a set of possible states. The state of the MRF is a list of states, one state for each of the discrete random variables.

In the following text, it is to be understood that a reference to an MRF is a reference to a discrete MRF, and that a reference to a variable is a reference to a discrete random variable of an MRF.

An MRF specifies a probability distribution over the N random variables $X_1, X_2, \ldots, X_N$ using a set of M potential functions $\psi_1, \psi_2, \ldots, \psi_M$. Each potential function $\psi_j$ is associated with one or more of the variables $X_1, X_2, \ldots, X_N$. Each potential function $\psi_j$ specifies a non-negative value for each combination of states of the variables associated with the potential function. For example, given 2 variables (N=2) where $X_1$ has two states 'a' and 'b' and where $X_2$ has three states 'x', 'y' and 'z', there may be a potential function $\psi_1$ that is associated with variables $X_1$ and $X_2$, thus $\psi_1$ provides 6 values for combinations of states (a,x), (a,y), (a,z), (b,x), (b,y) and (b,z). There may be a potential function $\psi_2$ that is associated with one variable $X_1$ thus $\psi_2$ provides 2 values i.e., for states 'a' and 'b'.

The probability distribution specified by a MRF over the N random variables $X_1, X_2, \ldots, X_N$ using the M potential functions $\psi_1, \psi_2, \ldots, \psi_M$ is given by the equation:

$$P(X = x) = \frac{1}{Z} \prod_{i=1}^{M} \psi_i(X_i = x_i)$$

where:
X is the set of N random variables $X_1, X_2, \ldots, X_N$, i.e. $X = X_1, X_2, \ldots, X_N$.
x is a state of the MRF, i.e. a combination of states, one state per variable of the MRF;
P(X=x) means the probability that the state of the MRF is x;
$X_i$ is the set of variables associated with the potential function $\psi_i$;
$x_i$ is the subset of x for the variables in $X_i$;
Z is the sum of the product of the potential functions $\psi_1, \psi_2, \ldots, \psi_M$ for all possible states of the MRF, i.e.:

$$Z = \sum_{x'} \prod_{i=1}^{M} \psi_i(X_i = x'_i)$$

where in the summation, the term x' is applied to each possible state of the MRF, and $x'_i$ is the subset of x' for the variables in $X_i$.

An MRF is fully defined by a set of variables, each with a set of states, and a set of potential functions.

In this description, the solution space of a probabilistic model refers to the set of all possible states of the probabilistic model. In the present implementation, the solution space of a probabilistic model is the set of all possible states of an MRF.

In this description, "solving" a probabilistic model refers to finding the most probable state of the probabilistic model. In this implementation, "solving" an MRF refers to finding the most probable state of the MRF, i.e. to find a value of x* that satisfies the following equation:

$$x^* = \underset{x}{\mathrm{argmax}} P(X = x)$$

which is the selecting of one state per variable that maximises the product of the values provided by the potential functions, for the selected states.

Returning to FIG. 3, the first part of the method 300, for analysing the first scene 310, proceeds as follows. The first step is a model construction step 320, which constructs a probabilistic model based on the image 311 of the first scene 310. As discussed above, in this implementation, the probabilistic model is an MRF, and the variables in the MRF represent the classifications of objects in the scene 310, where the objects are foreground blobs in the scene 310. Therefore, the MRF specifies a probability distribution over combinations of classifications of the foreground blobs in the scene. The model construction step 320 is shown in more detail in FIG. 4, and described further below. The output of the model construction step 320 is an MRF 321.

After the model construction step 320, the next step is a solution initialization step 330, which initializes a partitioning of the solution space of the MRF 321 produced by the model construction step 320. By "partitioning," it is meant that the solution space of the MRF 321 is arranged into one or more subsets, where:

(i) each subset contains at least one state of the MRF 321;

(ii) the set union of the subsets is equal to the solution space of the MRF 321; and (iii) each state of the MRF 321 is in exactly one subset.

In the text below, each such subset will be referred to as a partition. In this specific implementation, the solution initialization step 330 produces one partition 331, where the partition 331 contains the entire solution space of the MRF 321 constructed for the first scene 310. The partition is then stored in a priority queue, for example formed in the memory 109, so that the priority queue contains the partition only. In this implementation, the priority queue is preferably implemented as a heap data structure, where each element of the priority queue is a partition, and each element of the priority queue is associated with a priority value. The priority of the partition created by the solution initialization step 330 is set to 0, since priority does not matter for the first partition.

Figure 8A:
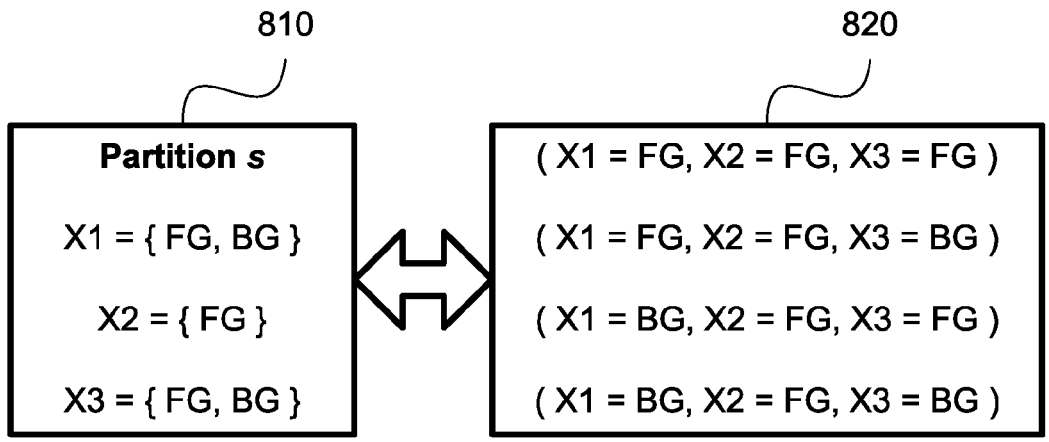
FIG. 8A shows an example of a subset of a solution space for a probabilistic model containing three discrete random variables.

In this implementation, a partition is represented as a set of lists of states, where there is one list of states for each variable in the MRF 321. A partition represents states of the MRF 321 that are a Cartesian product of the lists of states. FIG. 8A shows an example partition 810, labelled s, for an MRF with three variables X1, X2, and X3, where the list of states for X1 in the example partition 810 consists of foreground (FG) and background (BG), and the list of states for X2 in the example partition 810 contains only FG, and the list of states for X3 in the example partition consists of FG and BG. The example partition 810 represents the Cartesian product 820 of the lists of states for the variables X1, X2, and X3, which is the following four of the states of the MRF:

(i) (X1=FG, X2=FG, X3=FG)
(ii) (X1=FG, X2=FG, X3=BG)
(iii) (X1=BG, X2=FG, X3=FG)
(iv) (X1=BG, X2=FG, X3=BG)

Returning to FIG. 3, after the solution initialization step 330, the MRF 321 constructed for the first scene 310 is then solved by the solution partitioning step 340. The solution partitioning step 340 is shown in more detail in FIG. 6, and is described further below. The output of the solution partitioning step 340 is a set of partitions 341 for the MRF 321 constructed for the first scene 310, as well as the most likely state of the MRF 321 for the first scene 310.

After the solution partitioning step 340, the next step is the classification step 345, which classifies the objects in the first scene 310. Classifications 346 of the objects in the first scene 310 output from the classification step 345 are derived directly from the most likely state of the MRF 321 for the first scene 310, as determined by the solution partitioning step 340. For example, if the most likely state of the MRF was (X1=BG, X2=FG, X3=BG), then the classification of the object corresponding to the variable X1 is BG, and the classification of the object corresponding to the variable X2 is FG, and the classification of the object corresponding to the variable X3 is BG.

The second part of FIG. 3, for analysing the image 351 of the second scene 350 based on the analysis of the first scene 310, proceeds as follows. The first step of the second part of FIG. 3 is the model construction step 360, applied to the image 351 of the second scene 350. In this implementation, the model construction step 360 for the second scene 350 proceeds in the same way as the model construction step 320 for the first scene 310. The model construction step 360 for the second scene 350 thus produces an MRF 361 for the second scene 350, where the variables in the MRF 361 for the second scene 350 represent classifications of objects in the second scene 350, where the objects are foreground blobs.

After the model construction step 360 is applied to the second scene 350, the next step is the partition transfer step 370, which applies the partitioning 341 produced by the solution partitioning step 340 for the MRF 321 for the first scene 310 to the MRF 361 for the second scene 350. The partition transfer step 370 is shown in more detail in FIG. 7. The output of the partition transfer step 370 is a priority queue of partitions 371 for the MRF 361 for the second scene 350. Details of how to determine the priority used in the priority queue 371 will be described below.

After the partition transfer step 370, the MRF 361 for the second scene 350 is solved by the solution partitioning step 380, starting from the priority queue 371 of partitions produced by the partition transfer step 370. In this implementation, the solution partitioning step 380 applied to the MRF 361 for the second scene 350 is the same as the solution partitioning step 340 applied to the MRF 321 for the first scene 310. The output of the solution partitioning step 380 is a set of partitions 381 of the MRF 361 constructed for the second scene 350, as well as the most likely state 382 of the MRF 361 for the second scene 350.

The last step of FIG. 3 is a classification step 390, which classifies the objects in the second scene 350 according to the outputs 381, 382 of the solution partitioning step 380. In this implementation, the classification step 390 applied to the MRF 361 for the second scene 350 is the same as the classification step 345 applied to the MRF 321 for the first scene 310.

Figure 4:
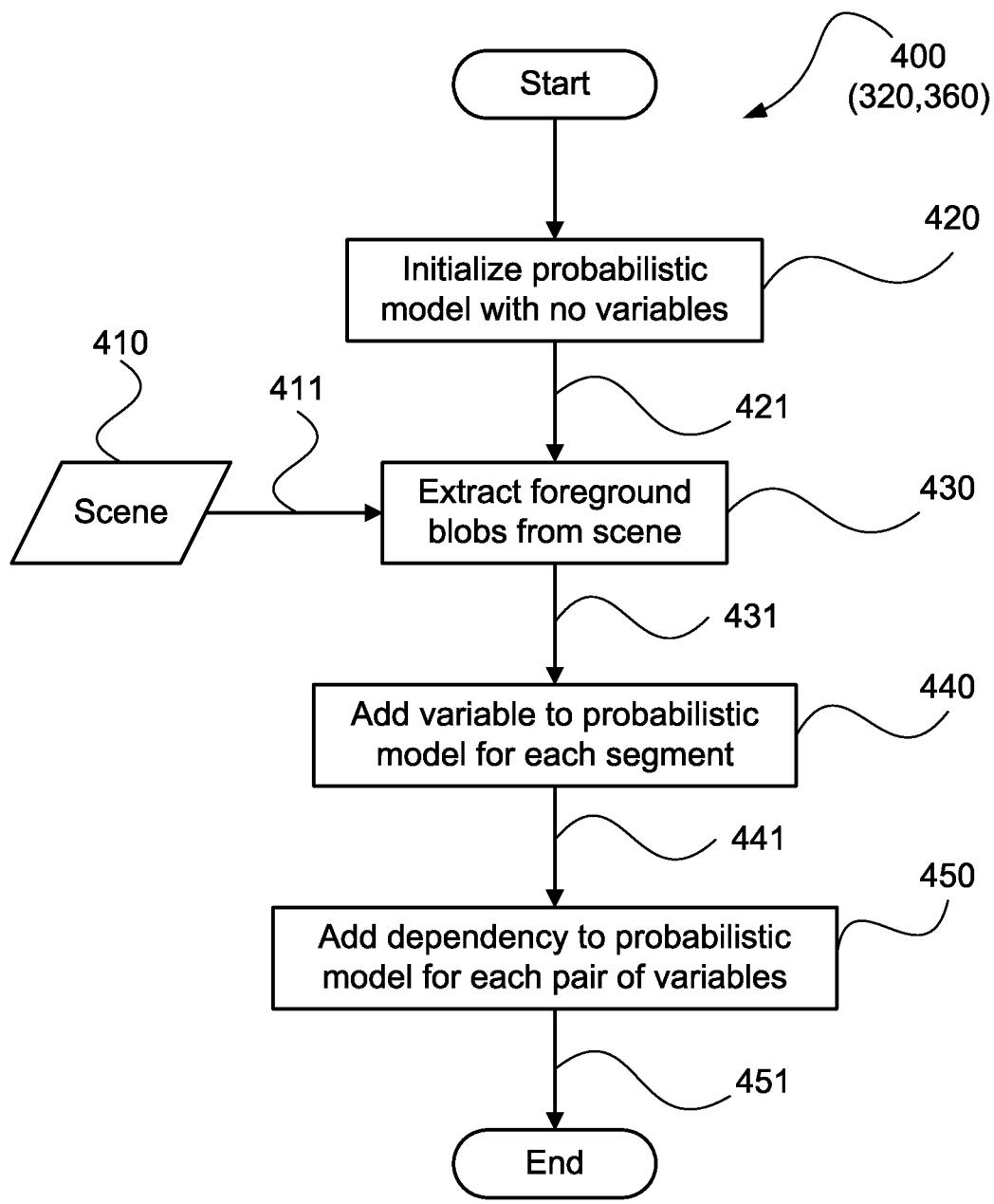
FIG. 4 is a schematic flow diagram, showing a method of constructing a probabilistic model for an input scene.

The model construction steps 320 and 360, which are functionally the same, will now be described in more detail, with reference to a model construction process 400 seen in FIG. 4. The input to the model construction process 400 is an image 411 of a scene 410, and the output is an MRF 451 for the scene 410. The first step of the model construction process 400 is a model initialization step 420, which creates an MRF 421 with no variables. In this implementation, an MRF is implemented as a list of variables, and a list of potential functions, where each potential function is implemented as an array of values. The array of values acts as a lookup table, containing the value of the potential function for each combination of states for the variables of the potential function. The model initialization step 420 therefore creates an empty list of variables and an empty list of potential functions as the MRF 421.

After the model initialization step 420, the next step is a foreground extraction step 430, which extracts foreground blobs from the image 411 of the input scene 410. In this implementation, the foreground extraction step 430 is implemented using background subtraction, which determines foreground blobs in the input scene 410 by analysing the difference between the input scene 410 and a pre-determined background model. The background model contains statistics of the appearance of the background for the scene. The foreground extraction step 430 thus determines foreground blobs in the scene 410 by finding areas of the scene 410 that differ significantly from the background model, according to the statistics of the appearance of the background for the scene. In another implementation, the foreground extraction step 430 may be implemented using color segmentation, by identifying blobs of pre-determined colors. In any event, the output of the foreground extraction step 430 is a set of foreground blobs 431 from the input scene 410.

After the foreground extraction step 430, the next step of the process 400 is a variable instantiation step 440. For each foreground blob of the set 431 identified by the foreground extraction step 430, the variable instantiation step 440 adds a variable to the MRF initialized by the model initialization step 420. Each variable represents the classification of a foreground blob in the input scene 410. The possible states of each variable are the possible classifications of the object corresponding to a foreground blob. The variable instantiation step 440 also adds a potential function for each variable of the MRF 431, thus forming a modified MRF 441, where the values of the potential function are derived from features of the foreground blob. In this implementation, the values of the potential function are determined from the difference between the input scene 410 and the background model.

After the variable instantiation step 440, the next step is a dependency instantiation step 450. For each pair of variables in the MRF 441, the dependency instantiation step 450 adds a potential function to the MRF 441 for that pair of variables, where the value of the potential function is indicative of the likelihood of the co-occurrence of each pair of object classifications. In this implementation, the same potential function is added for each pair of variables, and the values of the potential function are determined from parameter optimization on a training set. Further, the parameter optimization is performed using gradient ascent on an approximation of the log-likelihood of the ground truth classifications of the training set. The approximation of the log-likelihood is a piecewise approximation of the log-likelihood, that divides the MRFs of the training set into smaller overlapping MRFs, and sums the log-likelihood over the smaller overlapping MRFs. In another implementation, the parameter optimization is performed using gradient ascent on the pseudo-log-likelihood.

After the dependency instantiation step 450, the model construction process 400terminates with the constructed MRF 451 as the output.

Figure 5A:
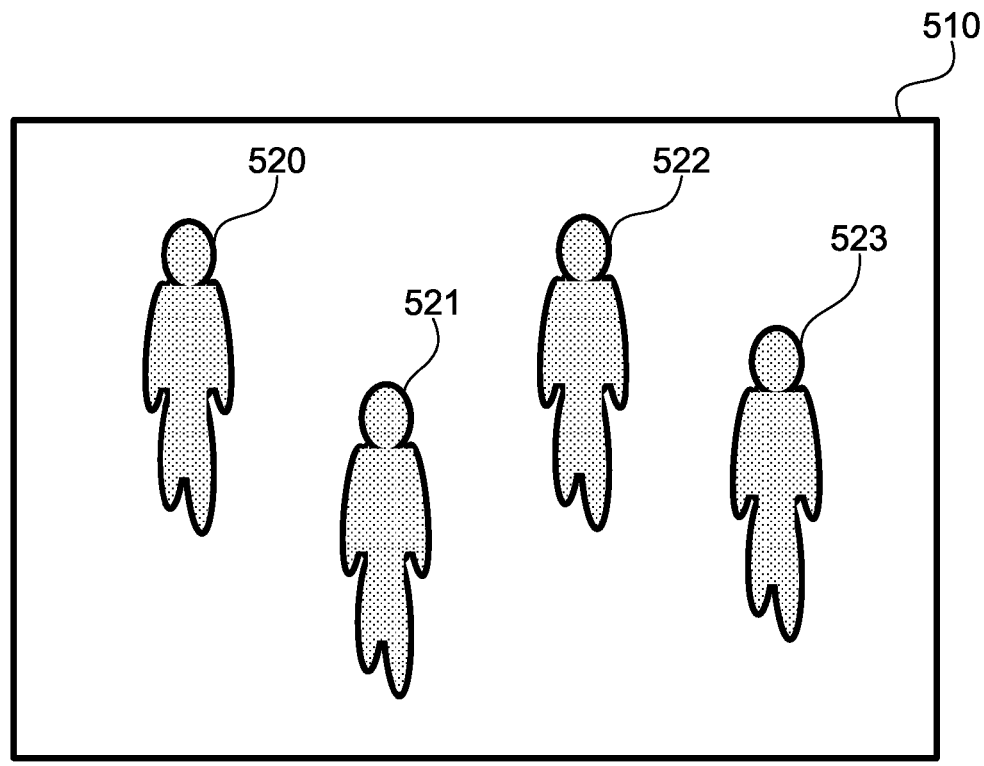
FIGS. 5A and 5B show an example image with segmented foreground blobs, and a graph illustrating an example probabilistic model for classifications of the foreground blobs.
Figure 5B:
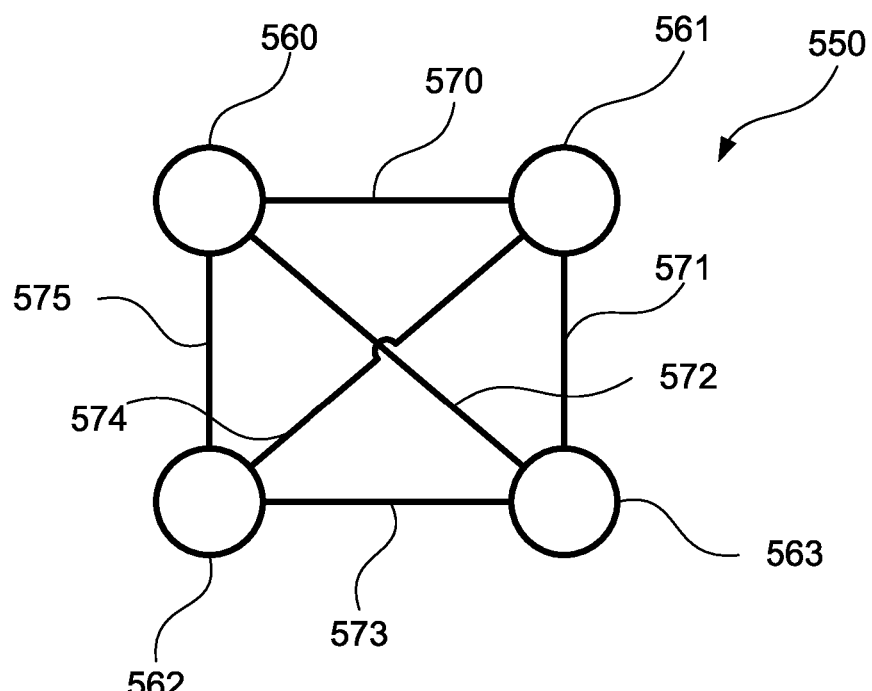

The model construction process 400 will now be described with reference to an example image 510, shown in FIG. 5A. The example image 510 contains four foreground blobs 520 to 523, each generally representative of a human figure. FIG. 5B shows a graphical depiction of an MRF 550 constructed by the model construction process 400 for the example image 510, where the circles 560 to 563 represent variables, and the six edges 570 to 575 between the circles represent potential functions between the pairs of variables connected by the edges. In the example image 510, for each foreground blob, the variable instantiation step 440 adds a variable for each shaded foreground blob 520 to 523, as shown by the circles 560 to 563, as well as four unary potential functions, one for each variable. In this implementation, the values of the unary potential function added by the variable instantiation step 440 for each discrete random variable are derived from the features of the foreground blob. Furthermore, the dependency instantiation step 450 adds a pairwise potential function between each pair of variables added by the variable instantiation step 440, as shown by the edges 570 to 575 between the circles, where the values of the pairwise potential functions are indicative of the likelihood of the co-occurrence of pairs of classifications of objects in a scene, in this case the image 510.

Figure 6:
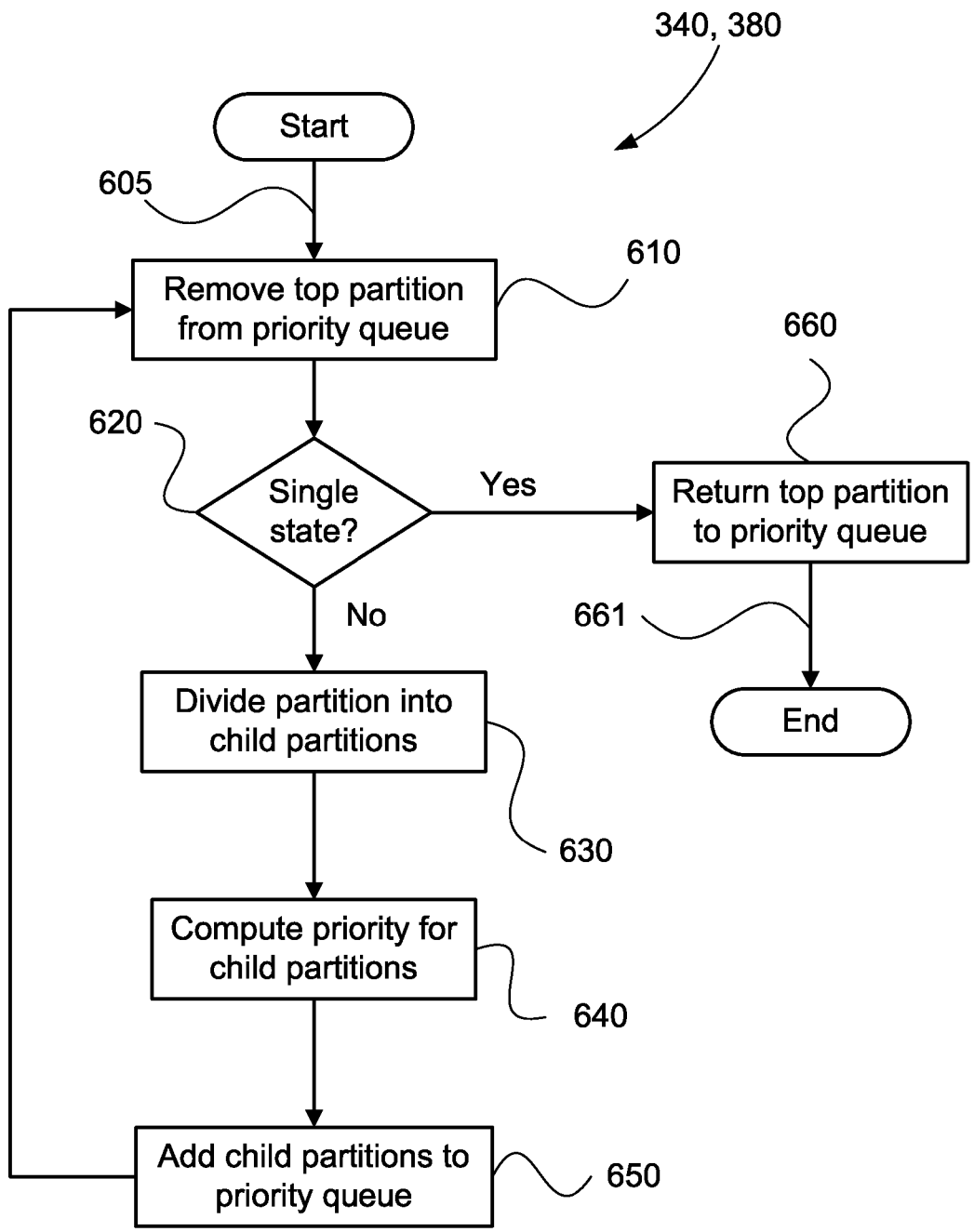
FIG. 6 is a schematic flow diagram, showing a method of finding the most likely state of a probabilistic model by partitioning the solution space of the probabilistic model.

The solution partitioning steps 340 and 380 will now be described in more detail with reference to FIG. 6. The input to the solution partitioning step 340/380 is a priority queue of partitions 605, provided by either the solution initialization step 330 from the first scene 310 or the partition transfer step 370 for the second scene 350. The output of the solution partitioning step 340/380 is the priority queue of partitions 661, where the top partition of the priority queue contains exactly one state of the MRF constructed for the input scene, where that one state is the state of the MRF with highest probability according to the MRF.

The solution partitioning step 340/380 begins with a queue pop step 610, which removes the top partition from the priority queue 605, where the "top partition" is the partition in the priority queue 605 with highest priority. If there are multiple partitions with equally highest priority, then any of those multiple partitions can be removed by the queue pop step 610.

After the queue pop step 610, a termination checking step 620 inspects the top partition removed from the priority queue 605 by the queue pop step 610, and determines whether the top partition consists of exactly one state of the MRF. If the top partition consists of exactly one state of the MRF, then the solution partitioning step 340/380 proceeds to a queue finalization step 660. If the top partition consists of more than one state of the MRF, then the solution partitioning step 340/380 proceeds to a partition division step 630.

As described previously, in this implementation, partitions are implemented as lists of states, where each partition contains a list of states for each variable in the MRF. A partition represents the Cartesian product of the lists of states stored in the partition. Therefore, if every list of states of the top partition has length equal to one, then the top partition consists of exactly one state of the MRF; otherwise, the top partition consists of more than one state of the MRF.

As described previously, if the top partition consists of exactly one state of the MRF, then the solution partitioning step 340/380 proceeds to the queue finalization step 660. The queue finalization step 660 inserts the top partition removed by the queue pop step 610 back into priority queue of partitions with infinite priority. This ensures that the partition removed by the queue pop step 610 is restored as the top partition before the solution partitioning step 340/380 terminates.

Returning to the termination checking step 620, if the top partition consists of more than one state of the MRF, then the solution partitioning step 340/380 proceeds to the partition division step 630. The partition division step 630 logically divides the top partition into child partitions. By "divides the top partition", it is meant that the partition division step 630 creates new partitions, where the new partitions are referred to as child partitions, such that:

(i) the set union of the states of the MRF represented by the child partitions is equal to the states of the MRF represented by the top partition; and (ii) the set intersection of the states of the MRF represented by any pair of child partitions is the empty set.

In this implementation, the partition division step 630 logically divides the top partition into two child partitions as follows. As described previously, in this implementation, partitions are implemented as lists of states, where the partition contains a list of states for each variable in the MRF. The partition division step 630 selects the largest list of states of the top partition. If multiple lists of states of the top partition have equally largest size, then the partition division step 630 arbitrarily selects one of those equally largest lists of states. The partition division step 630 then creates two child partitions. For the first child partition, the first half of the selected largest list of states is kept as the list of states for that variable. For the second child partition, the second half of the selected largest list of states is kept as the list of states for that variable. The remaining lists of states for the other variables in the top partition is copied into both child partitions. If the selected largest list of states in the top partition has a length that is odd, then one of the child partitions will have more states of the MRF than the other. In this implementation, if the selected largest list of states in the top partition has length that is odd, then the first child partition is larger than the second child partition.

Figure 8B:
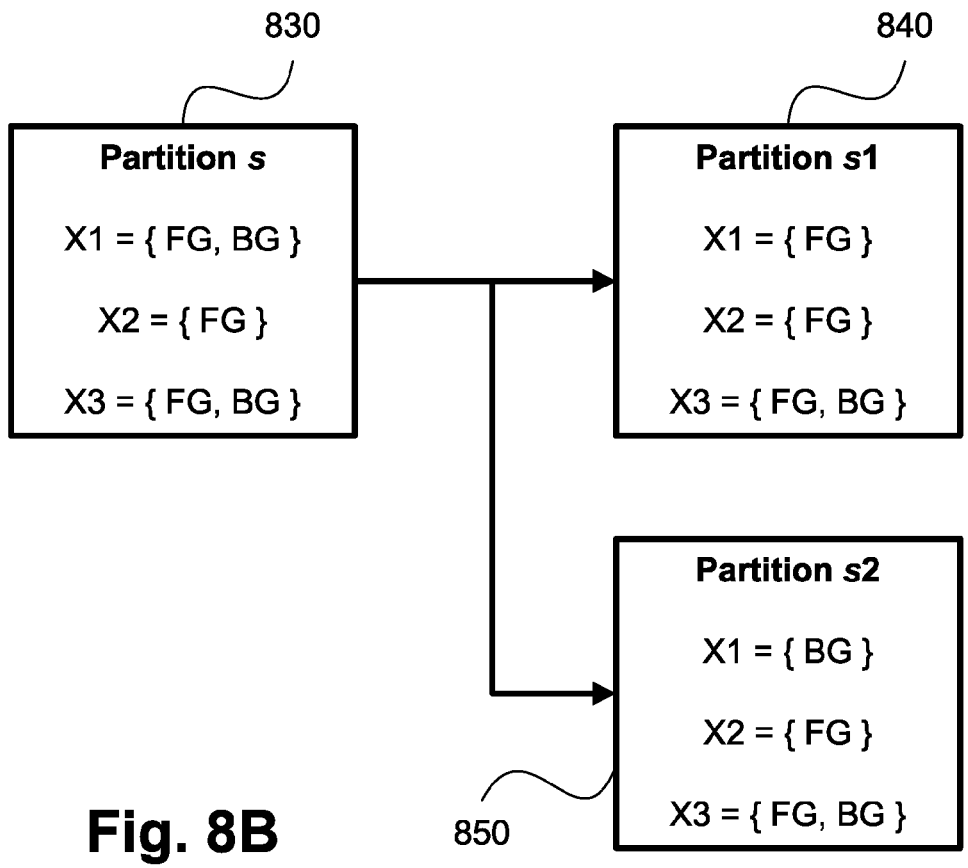
FIG. 8B shows an example of dividing a partition of a partitioning of a solution space for a probabilistic model into two child partitions.

The partition division step 630 will now be described with reference to an example top partition 830 and two example child partitions, being a first child partition 840 and a second child partition 850, as shown in FIG. 8B. The example top partition 830, labelled s, has three lists of states, corresponding to three variables X1, X2, and X3. In this example, the partition division step 630 selects the largest list of states in the partition. In the example top partition 830, the lists of states for the variables X1 and X3 have equally largest size. The partition division step 630 may thus select either of these lists of states. In the example shown, the partition division step 630 selects the list of states for the variable X1. The partition division step 630 then logically divides the example top partition 830 into two example child partitions. The first example child partition 840, labelled s1, has the first half of the list of states for the variable X1 in the example top partition 830, and the same lists of states for the variables X2 and X3. The second example child partition 850, labelled s2, has the second half of the list of states for the variable X1 in the example top partition 830, and the same lists of states for the variables X2 and X3.

Returning to FIG. 6, after the partition division step 630 has logically divided the top partition into child partitions, the next step is the priority computation step 640. The priority computation step 640 computes a priority value for each child partition, where the priority value is used to determine the priority of the child partition in the priority queue of partitions.

In this implementation, the priority value computed by the priority computation step 640 is an upper bound on the unnormalized product of the logarithm of the potential functions of the MRF. The priority is indicative of an upper bound of the probability of each state in the partition. Each potential function is associated with a set of variables, and the potential function specifies a non-negative value for each combination of states for the associated set of variables. For each child partition and each potential function, the priority computation step 640 finds the maximum value of the potential function for which the states associated with that value are in the respective lists of states in the child partition for the variables associated with the potential function. The priority value of the child partition is the sum of the logarithms of the maximum values of the potential functions. The priority computation step 640 computes the priority value in this manner for each child partition created by the partition division step 630.

After the priority computation step 640, the next step is a queue push step 650, which inserts the child partitions created by the partition division step 630 into the priority queue of partitions. The queue push 650 step inserts each child partition into the priority queue of partitions using the corresponding priority computed by priority computation 640.

After the queue push step 650, the solution partitioning steps 340/380 return to the queue pop step 610, to again remove the highest priority partition from the priority queue of partitions. As described previously, when the highest priority partition contains exactly one state, the solution partitioning step 340/380 concludes by re-inserting the highest priority partition in the priority queue in the queue finalization step 660, and outputting the priority queue of partitions 661.

Figure 7:
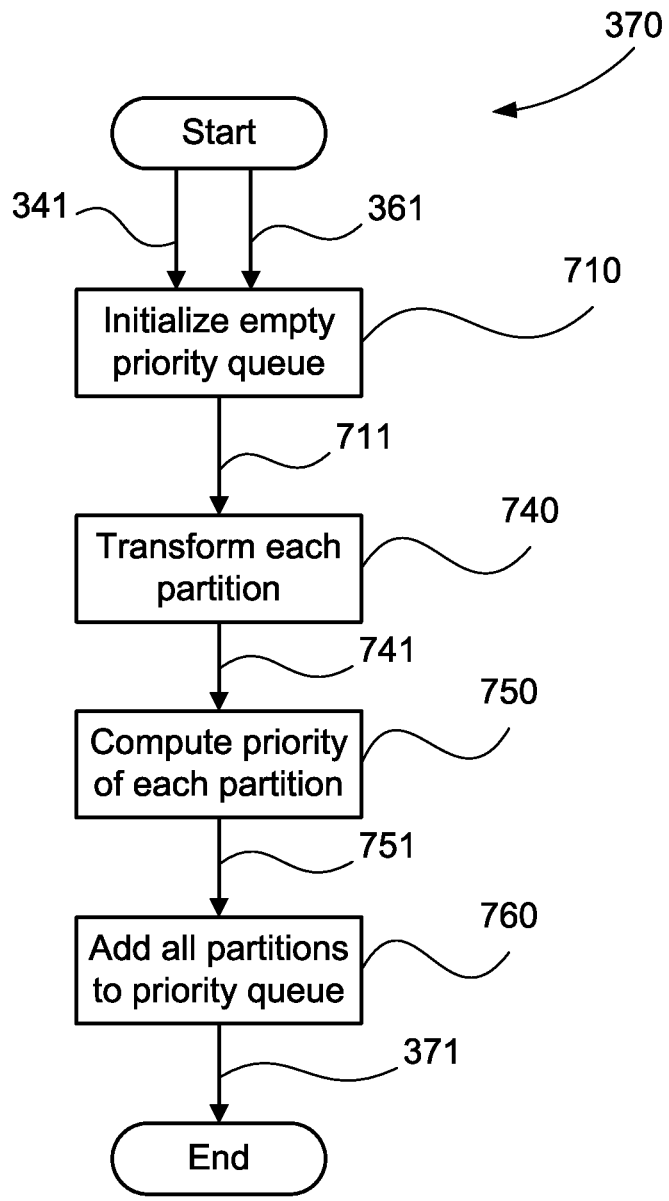
FIG. 7 is a schematic flow diagram, showing a method of applying a partitioning of a solution space for a probabilistic model to the solution space of a second probabilistic model.

The partition transfer step 370, for applying the partitioning from the first model, will now be described in more detail, with reference to FIG. 7. The input to the partition transfer step 370 is the MRF 361 for the second scene 350 and the priority queue of partitions 341 determined by the solution partitioning step 340 for the MRF 321 for the first scene 310. The output of the partition transfer step 370 is a priority queue of partitions 371 for the MRF 361 for the second scene 350.

The first step of the partition transfer step 370 is a queue initialization step 710. The queue initialization step 710 creates a new empty priority queue of partitions 711. As described previously, in this implementation, priority queues of partitions are preferably implemented as heap data structures.

After the queue initialization step 710, the next step is a partition transform step 740. One of the inputs to the partition transfer step 370 is the priority queue of partitions 341 determined by the solution partitioning step 340 for the MRF 321 for the first scene 310. For each partition in the priority queue 341 for the MRF 321 for the first scene 310, the partition transform step 740 creates a new equivalent partition 741 such that the new partition 741 contains a set of states of the MRF for the second scene 310. The operation of the partition transform step 740 depends on the difference between the MRF 321 for the first scene 310 and the MRF 361 for the second scene 350.

In this implementation, three kinds of differences between the MRF 321 for the first scene 310 and the MRF 361 for the second scene 350 are supported by the partition transform step 740, and cause the partition transform step 740 to operate as follows. The following text describes the operation of the partition transform step 740 on each partition.

The first kind of difference between the MRF 321 for the first scene 310 and the MRF 361 for the second scene 350 is that the difference is restricted to differences in the values of the potential functions only. In other words, whilst there is a one-to-one mapping between the variables and states in the MRF 321 for the first scene 310 and the variables and states in the MRF 361 for the second scene 350, the potential functions may be different. This kind of difference occurs when the first scene 310 and second scene 350 contain the same number of objects to be classified. In this implementation, the one-to-one mapping between the variables in the MRF 321 for the first scene 310 and the variables in the MRF 361 for the second scene 350 are determined by Euclidean distance, i.e. each object in the first scene 310 is mapped to the closest object in the second scene 350, where closest is determined spatially from the captured scene.

As described previously, in this implementation, each partition is formed as a list of states, where each list of states is associated with a discrete random variable of the MRF. For the first kind of difference, the partition transform step 740 makes no changes to partitions, with the understanding that after the partition transform step 740, the lists of states stored by the partitions are associated with discrete random variables and states of the MRF 361 for the second scene 350.

The second kind of difference between the MRF 321 for the first scene 310 and the MRF 361 for the second scene 350 is that the MRF 361 for the second scene 350 contains new states for some variables, either in addition to existing states of those variables, or in replacement of existing states of those variables. In other words, whilst there is a one-to-one mapping between the variables in the MRF 321 for the first scene 310 and the variables in the second scene 350, the MRF 361 for the second scene 350 contains new states and different potential function values. This kind of difference occurs when the first scene 310 and the second scene 350 contains the same number of objects to be classified, but it is desired to classify at least one of the objects in the second scene using more possible classes. In this implementation, the one-to-one mapping between the variables in the MRF 321 for the first scene 310 and the variables in the MRF 361 for the second scene 350 are determined by Euclidean distance, i.e. each object in the first scene 310 is mapped to the closest object in the second scene 350. Again, closest refers to the distance between objects in the scene.

For the second kind of difference, a partition is transformed by the partition transform step 740 as follows. For each variable for which new states have been added, the new states are added to the list of states for that variable in the partition. If the new states were added in replacement of an existing state and the list of states includes the state to be replaced, then the state to be replaced is removed from the list of states.

Figure 10A:
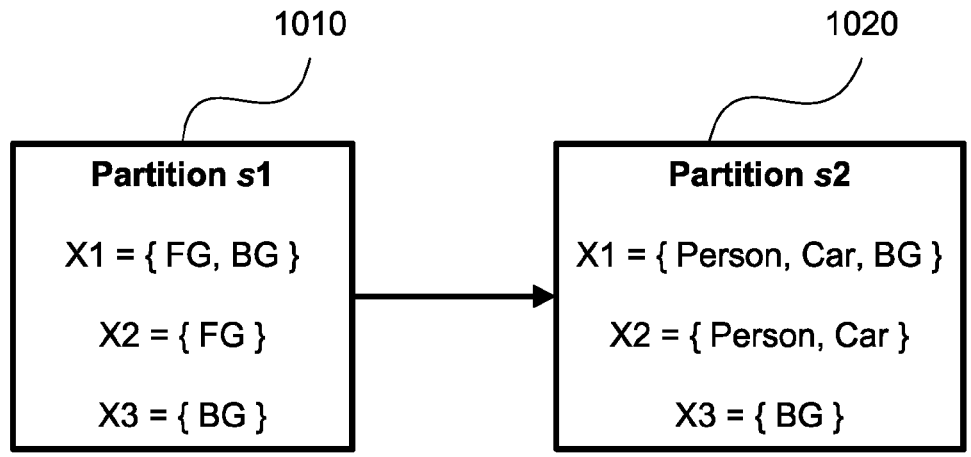
FIG. 10A shows an example of transforming a partition containing states of a first probabilistic model into a partition containing states of a second probabilistic model.

An example of the operation of the partition transform step 740 for the second kind of difference will now be described with reference to FIG. 10A, which shows an example first partition 1010, labelled s1, and an example second partition 1020, labelled s2. For this example, the example first partition 1010 is assumed to be for the MRF 321 for the first scene 310, with three variables X1, X2, and X3, and the difference between the MRF 321 for the first scene 310 and the MRF 361 for the second scene 350 is that the state "FG" for each variable in the MRF 321 for the first scene 310 is replaced with new states "Person" and "Car." For this example, the partition transform step 740 creates the example second partition 1020 with the same lists of states as the example first partition 1010, except that the state "FG" for the variables X1 and X2 is removed, and the states "Person" and "Car" added to the list of states for both variables X1 and X2. The list of states for the variable X3 does not contain the state "FG" and is unchanged in the example second partition 1020.

Figure 10B:
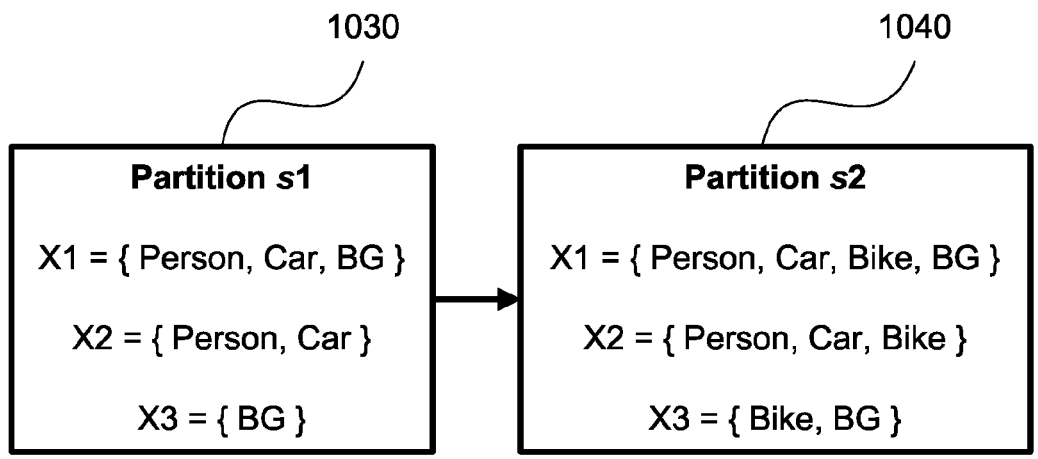
FIG. 10B shows an example of transforming a partition containing states of a first probabilistic model into a partition containing states of a second probabilistic model.

A second example of the operation of the partition transform step 740 for the second kind of difference will now be described with reference to FIG. 10B, which shows an example first partition 1030, labelled s1, and an example second partition 1040, labelled s2. As in the previous example, the example first partition 1030 is assumed to be for the MRF 321 for the first scene 310, with three variables X1, X2, and X3. For this example, the difference between the MRF 321 for the first scene 310 and the MRF 361 for the second scene 350 is that a new state "Bike" is added for all three variables X1, X2, and X3. For this example, the partition transform step 740 creates the example second partition 1040 with the same lists of states as the example first partition 1030, and adds the state "Bike" to the list of states for all three variables X1, X2, and X3.

The third kind of difference between the MRF for the first scene 310 and the MRF for the second scene 350 is that the MRF for the second scene 350 contains new variables in addition to the variables in the MRF for the first scene 310. The third kind of difference occurs when the second scene 350 contains more objects to be classified than the first scene 310. In this embodiment, the mapping between the variables in the MRF for the first scene 310 and the variables in the MRF for the second scene 350 are determined by Euclidean distance, i.e. each object in the first scene 310 is mapped to the closest object in the second scene 350. The remaining objects in the second scene 350 are then deemed to be the additional variables in the MRF for the second scene 350.

For the third kind of difference, for each new variable, the partition transform step 740 adds the new variable, and all of the possible states of the new variable, to the partition. The lists of states for other variables in the partition are unchanged.

Figure 11:
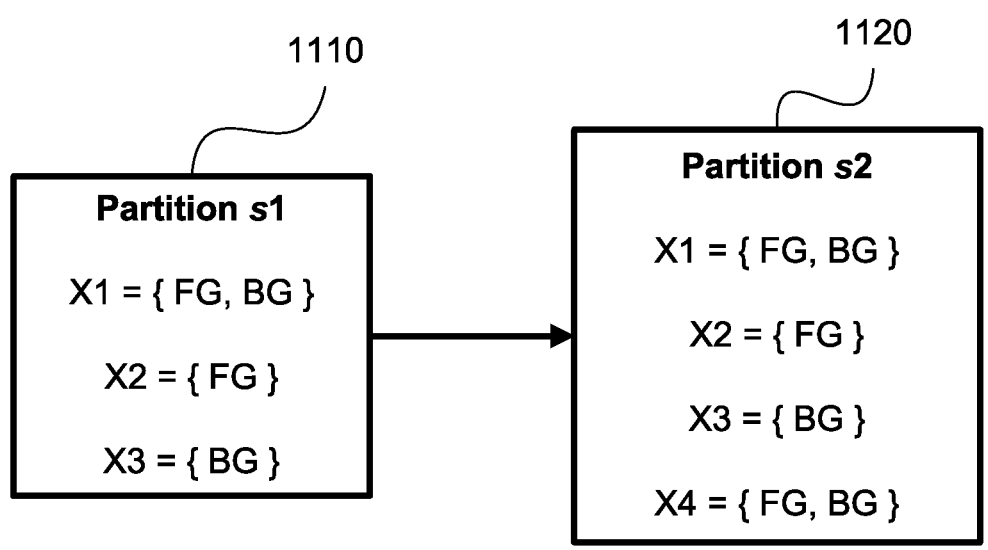
FIG. 11 shows an example of transforming a partition containing states of a first probabilistic model into a partition containing states of a second probabilistic model.
Figure 12:
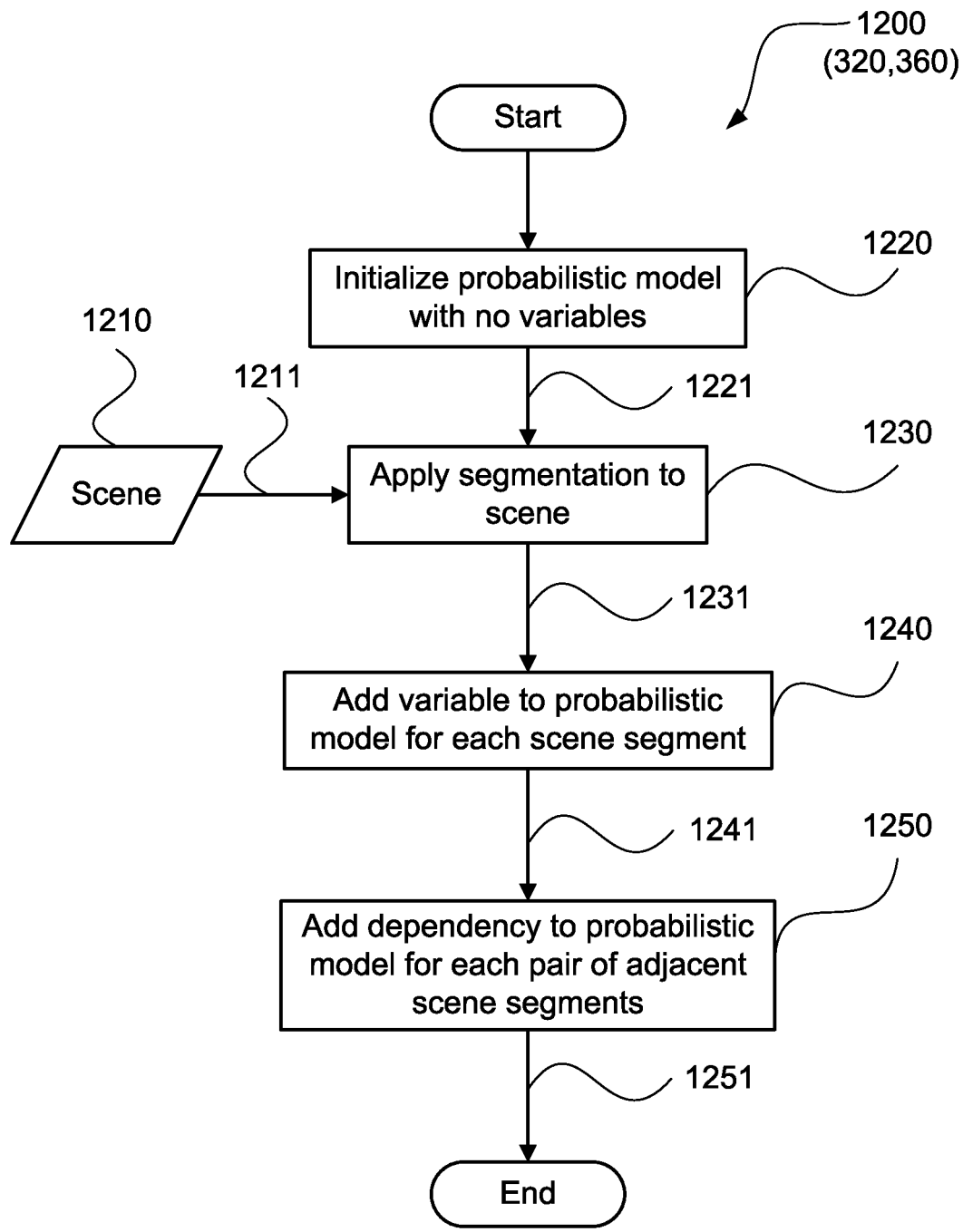
FIG. 12 is a schematic flow diagram, showing a method of constructing a probabilistic model for an input scene.

An example of the operation of the partition transform step 740 for the third kind of difference will now be described with reference to FIG. 11, which shows an example first partition 1110, labelled s1, and an example second partition 1120, labelled s2. For this example, the example first partition 1010 is assumed to be for the MRF 321 for the first scene 310, with three variables X1, X2, and X3, and the difference between the MRF 321 for the first scene 310 and the MRF 361 for the second scene 350 is that a new variable X4 is added with the states "FG" and "BG". For this example, the partition transform step 740 creates the example second partition 1120 with the lists of states in the example first partition 1110, and then adds a new list of states for the new variable X4, with the states "FG" and "BG".

Returning to FIG. 7, after the partition transform step 740 has transformed the partitions for the MRF 321 for the first scene 310 into partitions for the MRF 361 for the second scene 350, the next step is a priority update step 750, which computes a new priority value 751 for each transformed partition. In this implementation, the priority update step 750 uses the same method as the priority computation step 640, applied to the MRF 361 for the second scene 350. That is, for each transformed partition and each potential function of the MRF 361 for the second scene 350, the priority update step 750 finds the maximum value of the potential function for which the states associated with that value are in the respective lists of states in the transformed partition for the variables associated with the potential function. The priority value of the transformed partition is the sum of the logarithms of the maximum values of the potential functions. The priority update step 750 computes the priority value 751 in this manner for each transformed partition created by the partition transform step 740.

After the priority update step 750, the next step is a queue update step 760. The queue update step 760 inserts each transformed partition 741 into the priority queue 711 of partitions created by the queue initialization step 710, using the priority value 751 computed by the priority update step 750. The partition transfer step 370 then returns the priority queue 371 of partitions from the queue update step 760 as the output.

Figure 9:
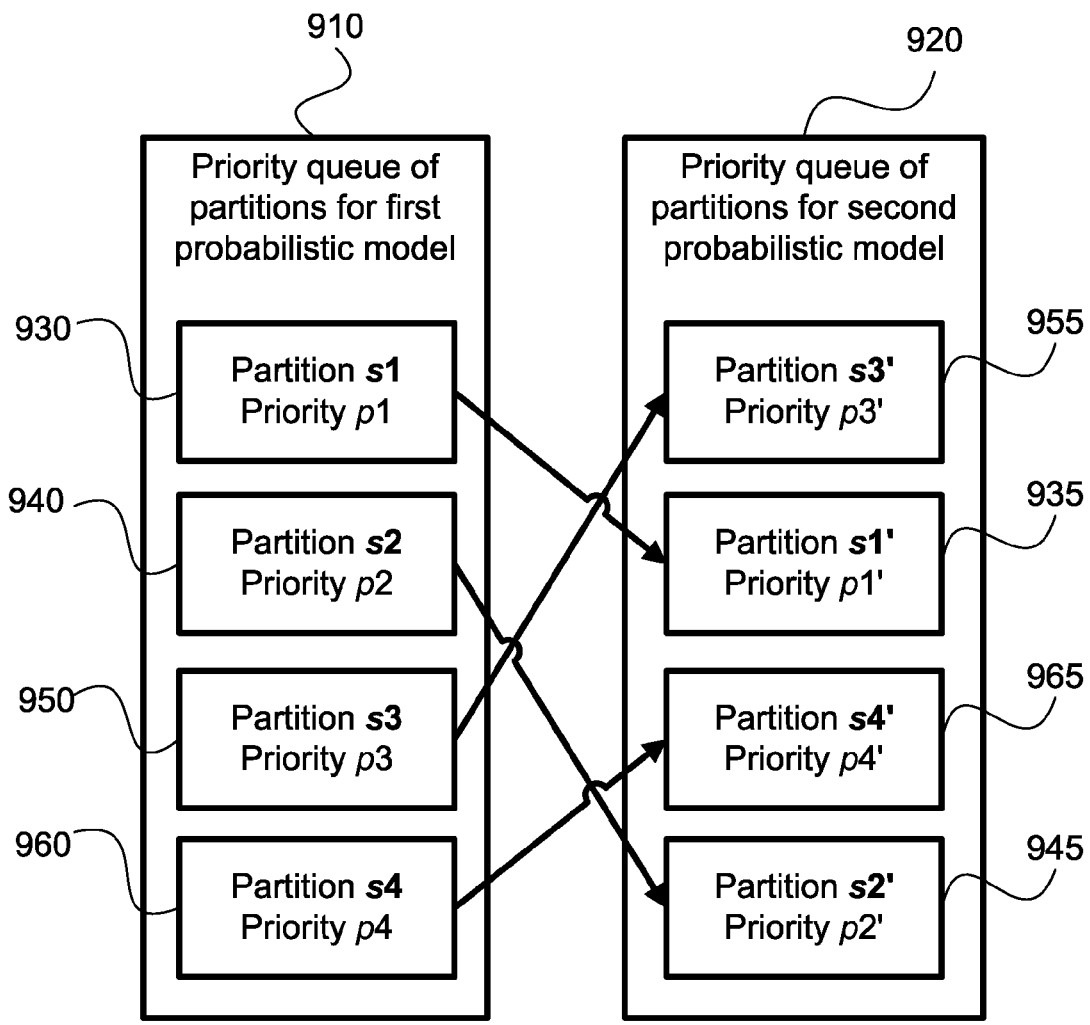
FIG. 9 shows an example of initialization of a priority queue of partitions for a second probabilistic model based on a priority queue of partitions for a first probabilistic model.

An example operation of the partition transfer step 370 will now be described with reference to FIG. 9, which shows a first priority queue 910 and a second priority queue 920, where the first priority queue 910 contains partitions for the MRF 321 for the first scene 310, and the second priority queue 920 contains partitions for the MRF 361 for the second scene 350. In FIG. 9, the first priority queue 910 contains four partitions: a first partition 930, labelled s1, with priority p1; a second partition 940, labelled s2, with priority p2; a third partition 950, labelled s3, with priority p3; and a fourth partition 960, labelled s4, with priority p4.

The partition transfer step 370 begins with the queue initialization step 710, which initializes the second priority queue 920 as an empty priority queue.

The next step is the partition transform step 740, which transforms each partition in the first priority queue 910. The partition transform step 740 transforms:

(i) the first partition 930 into a transformed first partition 935, labelled s1';

(ii) the second partition 940 into a transformed second partition 945, labelled s2';

(iii) the third partition 950 into a transformed third partition 955, labelled s3'; and (iv) the fourth partition 960 into a transformed fourth partition 965, labelled s4'.

The next step is the priority update step 750. The priority update step 750 computes a new priority value for each of the transformed partitions determined by the partition transform step 740, according to the MRF 361 for the second scene 750. The priority update step 750 thus computes:

(i) the new priority value p1' for the transformed first partition 935;

(ii) the new priority value p2' for the transformed second partition 945;

(iii) the new priority value p3' for the transformed third partition 955; and (iv) the new priority value p4' for the transformed fourth partition 965.

The next step is the queue update step 760. The queue update step 760 inserts the transformed partitions determined by the partition transform step 740 into the second priority queue 920. Each transformed partition is inserted into the second priority queue 920 with the priority value computed by priority update step 750. In this example, the queue update step 760 thus inserts into the second priority queue 920:

(i) the transformed first partition 935 with priority p1';
(ii) the transformed second partition 935 with priority p2';
(iii) the transformed third partition 935 with priority p3'; and
(iv) the transformed fourth partition 935 with priority p4'.

The partition transfer step 370 then terminates with the second priority queue 920 as the output. As shown in FIG. 9, the ordering of the transformed partitions in the second priority queue 920 may be different to the ordering of their equivalent partitions in the first priority queue 910, as the new priority values computed by the priority update step 750 may be different to the original priority values.

Second Implementation

In a second implementation, the partition transfer step 370 creates a smaller number of partitions for the MRF 361 for the second scene 350, according to a pre-determined number of initial partitions. Further, the partition transfer step 370 performs the queue initialization step 710 as described above. For the partition transform step 740, the second implementation creates transformed partition for only n highest priority partitions in the priority queue for the MRF 321 for the first scene 310, where n is the pre-determined number of initial partitions. The transformation of the n highest priority partitions from the MRF 321 for the first scene 310 into transformed partitions for the MRF 361 for the second scene 350 is performed in the same manner as in the first implementation described above.

The partition transform step 740 in the second implementation creates a last partition, by aggregating remaining partitions in the priority queue for the MRF 321 for the first scene 310. The aggregation is preferably performed by processor 105 computing the set union of the remaining partitions. In the second implementation, the aggregation is performed as follows. For each variable of the MRF 321 for the first scene 310, the set union of the corresponding list of states in each remaining partition is computed by the processor 105, forming an aggregated list of states for each variable. The last partition is then represented by the aggregated lists of states. The last partition is then transformed into a partition for the MRF 361 for the second scene 350 in the same manner as described above. Care should be taken during the aggregation that the aggregated states does not contain a state already used in another partition as this would violate the rule, discussed above, that each state of the MRF is in exactly one subset.

The partition transfer step 370 in the second implementation proceeds to the priority update step 750 and the queue update step 760 in the same manner as described above.

Third Implementation

In a third implementation, the partition transfer step 370 creates a smaller number of partitions for the MRF 361 for the second scene 350, according to a pre-determined parameter. If the value of the pre-determined parameter is c, then the partition transform step 740 can create a transformed partition for all partitions in the priority queue for the MRF 321 for the first scene 310 that have priority at least c×p, where p is the priority of the highest priority partition in the priority queue, and the value of the pre-determined parameter c is greater than zero and less than one. A last partition is created with the remaining partitions in the priority queue for the MRF 321 for the first scene 310, in the same manner as in the second implementation. The queue initialization step 710, the priority update step 750, and the queue update step 760 are each performed in the same manner as in the second implementation described above.

Alternative Application

An alternative application will now be described. The alternative application operates in the same way as the implementation described above, except that the objects in the scene to be classified are now segments rather than foreground blobs, where the segments are determined according to a segmentation of the scene. According to the alternative application, the model construction process 400 shown in FIG. 4 used in steps 320 and 360, is replaced with the model construction process 1200 shown in FIG. 12.

An input to the model construction process 1200 is an image 1211 of a scene 1210, and the output is an MRF 1251 for the scene 1210. The first step of the model construction process 1200 is a model initialization step 1220, which creates an MRF 1221 with no variables. In this application, an MRF is implemented as a list of variables, and a list of potential functions, where each potential function is implemented as an array of values. The array of values acts as a lookup table, containing the value of the potential function for each combination of states for the variables of the potential function. The model initialization step 1220 therefore creates an empty list of variables and an empty list of potential functions.

After the model initialization step 1220, the next step is a segmentation step 1230, which segments the image 1211 of the input scene 1210 into segments. In this application, the segmentation step 1230 determines segments for the input scene 1210 by a clustering method. In a preferred clustering method, each pixel in the input scene 1210 is represented as a five-dimensional vector, formed of the three-dimensional color vector of the pixel in CIELAB color space, and the x and y locations of the pixel. The clustering method begins by selecting cluster seed locations, where cluster seed locations are positioned uniformly over the x and y locations of the image 1211 of the input scene 1210. The number of cluster seed locations is specified manually, such as 1000 cluster seeds for an input scene 1210 with width 640 pixels and height 480 pixels. Pixels are then assigned to clusters by determining the closest cluster seed location according to a distance measure. The distance measure between two pixels is a weighted sum of the Euclidean distance between the color vectors of the two pixels in CIELAB color space and the Euclidean distance between the pixels in x and y locations. The output of the segmentation step 1230 is a list of segments 1231 in the input scene 1210.

After the segmentation step 1230, the next step is a variable instantiation step 1240. For each segment in the list 1231 produced by the segmentation step 1230, the variable instantiation step 1240 adds a variable to the MRF 1221 initialized by the model initialization step 1220. Each variable represents the classification of a segment in the input scene 1210. The possible states of each variable are the possible classifications of objects. The variable instantiation step 1240 also adds a potential function for each variable of the MRF 1221, where the values of the potential function are derived from features of the segment. In this application, each potential function is implemented as an array of values, where the values are determined from color and texture features of the segment.

After the variable instantiation step 1240, the next step is a dependency instantiation step 1250. For each pair of variables in the MRF 1221 that correspond to adjacent segments in the input scene 1210, the dependency instantiation step 1250 adds a potential function to the MRF 1221 for that pair of variables. The added potential function specifies a non-negative value for each combination of states for the pair of variables. The non-negative value is indicative of the likelihood of the co-occurrence of the states for adjacent segments in the input scene 1210. In this application, the same potential function is added for each pair of variables that correspond to adjacent segments, and the values of the potential function are determined from parameter optimization on a training set. The parameter optimization uses the same methods as described for the dependency instantiation step 1250 in the first implementation.

After the dependency instantiation step 1250, the model construction process 1200 terminates with the MRF 1251 as the output.

Figure 13A:
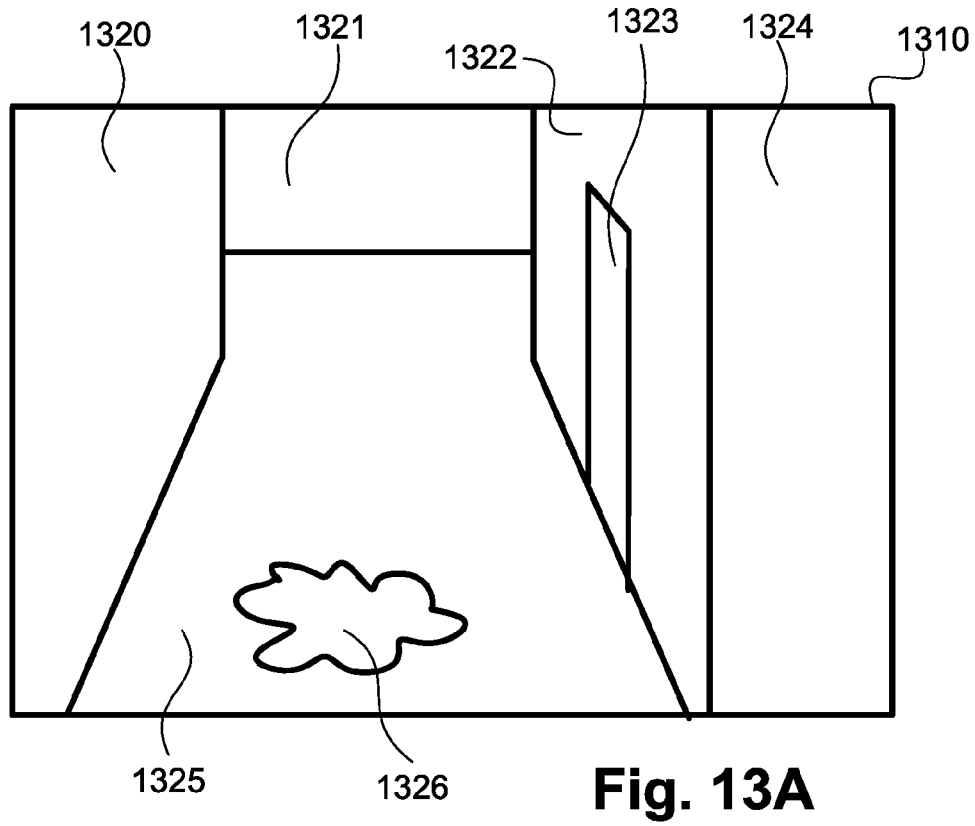
FIGS. 13A and 13B show an example image that has been segmented, and a graph illustrating an example probabilistic model for classifications of the segments of the image.
Figure 13B:
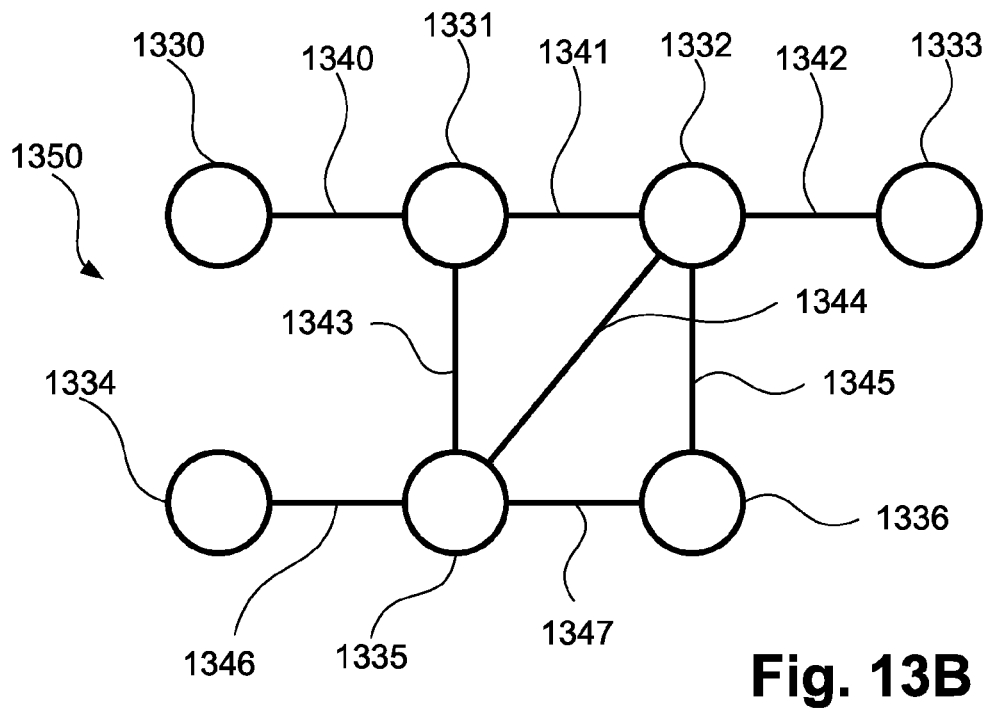

The model construction process 1200 of the alternative application will now be described with reference to an example image 1310, shown in FIG. 13A, which shows an example image 1310 containing seven segments 1320 to 1326. FIG. 13B shows a graphical depiction of an MRF 1350 constructed by the model construction process 1200 for the example image 1310, where the circles 1330 to 1336 represent the variables of the MRF 1350, and the edges 1340 to 1347 between the variables represent potential functions between the connected variables. In the example image 1310, for each of the seven segments 1320 to 1326, the variable instantiation step 1240 adds a variable for the segment, as shown by the circles 1330 to 1336, as well as a potential function for each variable. In this example, the values of the potential function added by the variable instantiation step 1240 for each variable are derived from color and texture features of the segment 1320 to 1326. Furthermore, the dependency instantiation step 1250 adds a potential function between each pair of variables added by the variable instantiation step 1240 that correspond to a pair of adjacent segments, as shown by the edges 1340 to 1347 between the circles, where the values of the potential functions are indicative of the likelihood of the co-occurrence of pairs of classifications of objects in a scene.

INDUSTRIAL APPLICABILITY

The arrangements described are applicable to the computer and data processing industries and particularly for the classification of images.

The foregoing describes only some embodiments of the present invention, and modifications and/or changes can be made thereto without departing from the scope and spirit of the invention, the embodiments being illustrative and not restrictive.

The invention claimed is:

1. A method of classifying objects in a scene, captured by a camera, the method comprising:
   determining a likelihood of first set of states for the objects in the scene, each of the first set of states being a classification of one of the objects in the scene;
   partitioning a solution space based on the determined likelihood of the first set of states, each partition of the solution space representing combinations of the classifications of the objects in the scene;
   applying the partitioning of the solution space to a solution space of a second set of states, each partition of the solution space of the second set of states representing combinations of the classifications of a subset of objects in the scene;
   determining a likelihood of the second set of states for the subset of the objects in the scene, each state of the second set of states being a classification of one of the subset of objects in the scene; and
   classifying at least one of the subset of objects in the scene according to the determined likelihood of the second set of states and the partitioning of the solution space of the second set of states.

2. A method of classifying objects in a scene, the method comprising:
   determining a likelihood of first set of states for the objects in a first scene representation, each of the first set of states being a classification of one of the objects in the first scene representation;
   partitioning a solution space based on the determined likelihood of the first set of states, each partition of the solution space representing combinations of the classifications of the objects in the first scene representation;
   applying the partitioning of the solution space to a solution space of a second set of states, each partition of the solution space of the second set of states representing combinations of the classifications of a subset of objects in a second scene representation associated with the scene;

determining a likelihood of the second set of states for the subset of the objects in the scene, each state of the second set of states being a classification of one of the subset of objects in the second scene representation; and classifying at least one of the subset of objects in the second scene representation according to the determined likelihood of the second set of states and the partitioning of the solution space of the second set of states.

3. A method according to claim 2 wherein the first scene representation is formed from a first image of a first scene, and the second scene representation is formed from a second image of a second scene.

4. A method according to claim 3 wherein the first and second scenes at least partly overlap.

5. A method according to claim 2 wherein the partitions are formed as lists of states, where each list of states is associated with a discrete random variable of the first or second scene representation.

6. A method according to claim 5 wherein the first and second scene representations comprise discrete Markov random field (MRF) representations, and for a first kind of difference between the scene representations, the partitioning makes no changes to the partitions, and the lists of states stored by the partitions are associated with discrete random variables and states of the second scene representation.

7. A method according to claim 6 wherein the first kind of difference comprises difference in values of potential functions of the scene representations.

8. A method according to claim 5, wherein the first and second scene representations comprise discrete Markov random field (MRF) representations, and for a second kind of difference, a partition is transformed, for each variable for which new states have been added, by adding the new states to the list of states for that variable in the partition.

9. A method according to claim 8, wherein the new states are added in replacement of an existing state and the list of states includes the state to be replaced, then the state to be replaced is removed from the list of states.

10. A method according to claim 8 wherein the second kind of difference between the scene representations is where the second scene representation comprises new states for variables, the new states being in addition to existing states of those variables or in replacement of existing states of those variables.

11. A method according to claim 5, wherein the first and second scene representations comprise discrete Markov random field (MRF) representations, and for a third kind of difference, a partition is transformed, for each new variable, by adding all of the possible states of the new variable to the partition, wherein the lists of states for other variables in the partition are unchanged.

12. A method according to claim 11 wherein the third kind of difference comprises the second scene representation containing new variables in addition to the variables of the first scene representation.

13. A method according to claim 5, wherein the first and second scene representations comprise discrete Markov random field (MRF) representations, and the partitioning is responsive to three kinds of differences between the scene representations, being:

(i) a first kind of difference between the scene representations, the partitioning makes no changes to the partitions, and the lists of states stored by the partitions are associated with discrete random variables and states of the second scene representation, the first kind of difference comprising differences in values of potential functions of the scene representations;

(ii) a second kind of difference, where a partition is transformed, for each variable for which new states have been added, by adding the new states to the list of states for that variable in the partition, wherein the new states are added in replacement of an existing state and the list of states includes the state to be replaced, then the state to be replaced is removed from the list of states, wherein the second kind of difference between the scene representations is where the second scene representation comprises new states for variables, the new states being in addition to existing states of those variables or in replacement of existing states of those variables; and (iii) a third kind of difference, where a partition is transformed, for each new variable, by adding all of the possible states of the new variable to the partition, wherein the lists of states for other variables in the partition are unchanged, wherein the third kind of difference comprises the second scene representation containing new variables in addition to the variables of the first scene representation.

14. A method according to claim 5, wherein the first and second scene representations comprise discrete Markov random field (MRF) representations, and the step of applying the partitioning comprises applying the partitioning of a first model derived from the first scene representation to a second model associated with the second scene representation.

15. A method according to claim 5, wherein the partitioning further comprises storing the partitions in a priority queue ordered according to the first scene representation and the applying comprises transforming the stored partitions into partitions of the second scene representation.

16. A method according to claim 15, further comprising adding a new variable to each partition in the priority queue such that partitions of the second scene representation derived from the first scene representation are identifiable therefrom.

17. A non-transitory computer readable storage medium having a program recorded thereon, the program being executable by a processor to classify objects in a scene, captured by a camera, the program comprising:

code for determining a likelihood of first set of states for the objects in the scene, each of the first set of states being a classification of one of the objects in the scene;

code for partitioning a solution space based on the determined likelihood of the first set of states, each partition of the solution space representing combinations of the classifications of the objects in the scene;

code for applying the partitioning of the solution space to a solution space of a second set of states, each partition of the solution space of the second set of states representing combinations of the classifications of a subset of objects in the scene;

code for determining a likelihood of the second set of states for the subset of the objects in the scene, each state of the second set of states being a classification of one of the subset of objects in the scene; and code for classifying at least one of the subset of objects in the scene according to the determined likelihood of the second set of states and the partitioning of the solution space of the second set of states.

18. A non-transitory computer readable storage medium having a program recorded thereon, the program being executable by a processor to classify objects in a scene, the program comprising:

code for determining a likelihood of first set of states for the objects in a first scene representation, each of the first set of states being a classification of one of the objects in the first scene representation;

code for partitioning a solution space based on the determined likelihood of the first set of states, each partition of the solution space representing combinations of the classifications of the objects in the first scene representation;

code for applying the partitioning of the solution space to a solution space of a second set of states, each partition of the solution space of the second set of states representing combinations of the classifications of a subset of objects in a second scene representation associated with the scene;

code for determining a likelihood of the second set of states for the subset of the objects in the scene, each state of the second set of states being a classification of one of the subset of objects in the second scene representation; and code for classifying at least one of the subset of objects in the second scene representation according to the determined likelihood of the second set of states and the partitioning of the solution space of the second set of states.

19. Computerised apparatus comprising a processor, a memory coupled to the processor, and a program recorded in the memory, the program being executable by the processor to classify object in a scene captured by a camera, the program comprising:

code for determining a likelihood of first set of states for the objects in the scene, each of the first set of states being a classification of one of the objects in the scene;

code for partitioning a solution space based on the determined likelihood of the first set of states, each partition of the solution space representing combinations of the classifications of the objects in the scene;

code for applying the partitioning of the solution space to a solution space of a second set of states, each partition of the solution space of the second set of states representing combinations of the classifications of a subset of objects in the scene;

code for determining a likelihood of the second set of states for the subset of the objects in the scene, each state of the second set of states being a classification of one of the subset of objects in the scene; and code for classifying at least one of the subset of objects in the scene according to the determined likelihood of the second set of states and the partitioning of the solution space of the second set of states.

* * * * *